United States Patent
Hosseini et al.

(10) Patent No.: US 11,005,623 B2
(45) Date of Patent: May 11, 2021

(54) DEMODULATION REFERENCE SIGNAL CONFIGURATION FOR SHORTENED TRANSMISSION TIME INTERVAL BASELINE PATTERN

(71) Applicant: QUALCOMM Incorporated, San Diego, CA (US)

(72) Inventors: Seyedkianoush Hosseini, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/388,704

(22) Filed: Apr. 18, 2019

(65) Prior Publication Data
US 2019/0327048 A1     Oct. 24, 2019

Related U.S. Application Data

(60) Provisional application No. 62/661,631, filed on Apr. 23, 2018.

(51) Int. Cl.
*H04W 4/00* (2018.01)
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2011/0317596 A1* | 12/2011 | Jongren | H04W 72/042 370/280 |
| 2018/0167116 A1* | 6/2018 | Rahman | H04B 7/06 |
| 2019/0140729 A1* | 5/2019 | Zhang | H04B 7/063 |
| 2019/0182001 A1* | 6/2019 | Lee | H04W 52/34 |

OTHER PUBLICATIONS

International Search Report and Written Opinion—PCT/US2019/028306—ISA/EPO—dated Jul. 25, 2019.

(Continued)

*Primary Examiner* — Clemence S Han
(74) *Attorney, Agent, or Firm* — Holland & Hart LLP

(57) ABSTRACT

Methods, systems, and devices for wireless communications are described. One method may include identifying a baseline demodulation reference signal (DMRS) mapping pattern for mapping of DMRS data to resource elements (REs) within a shortened transmission time interval (sTTI) based on a number of layers for which a user equipment (UE) is configured. In some examples, the number of layers may be configured on a per-unit basis. The method may further include determining a shifted DMRS mapping pattern based on the baseline DMRS mapping pattern and a reference signal configuration associated with reference signals other than a DMRS, configuring REs within the sTTI according to the shifted DMRS mapping pattern, and transmitting the configured REs.

30 Claims, 17 Drawing Sheets

(56) References Cited

OTHER PUBLICATIONS

LG Electronics: "Consideration on DL DMRS for sTTI", 3GPP Draft, R1-1717257 DL DMRS for STTI, 3RD Generation Partnership Project (3GPP), Mobile Competence Centre ; 650, Route Des Lucioles ; F-06921 Sophia-Antipolis Cedex , France, vol. RAN WG1, No. Prague. Czech Republic, Oct. 9, 2017-Oct. 13, 2017, Oct. 8, 2017 (Oct. 8, 2017). XP051340448, Retrieved from the Internet: URL:http://www.3gpp.org/ftp/Meetings_3GPP_SYNC/RAN1/Docs/ [Retrieved on Oct. 8, 2017], Section 2.2, Proposal 7.

Nokia et al., "On Details of DMRS Design for 2-OS and 7-OS DL Shorter TTI", 3GPP Draft; R1-1717449 on Details of DMRS Design for 2-OS and 7-OS DL Shorter TTI, 3RD Generation Partnership Project (3GPP), Mobile Competence Centre ; 650, Route Des Lucioles ; F-06921 Sophia-Antipo, vol. RAN WG1, No. Prague, Czech Republic; Oct. 9, 2017-Oct. 13, 2017, Oct. 8, 2017 (Oct. 8, 2017), XP051340638, 12 Pages, Retrieved from the Internet: URL:http://www.3gpp.org/ftp/Meetings_3GPP_SYNC/RAN1/Docs/ [retrieved on Oct. 8, 2017), Sections 2.2-2.4, Appendix A, Proposals.

\* cited by examiner

DEMODULATION REFERENCE SIGNAL CONFIGURATION FOR SHORTENED TRANSMISSION TIME INTERVAL BASELINE PATTERN

CROSS REFERENCES

The present Application for Patent claims the benefit of U.S. Provisional Patent Application No. 62/661,631 by HOSSEINI, et al., entitled "DEMODULATION REFERENCE SIGNAL CONFIGURATION FOR SHORTENED TRANSMISSION TIME INTERVAL BASELINE PATTERN," filed Apr. 23, 2018, assigned to the assignee hereof, and expressly incorporated by reference herein.

BACKGROUND

The following relates generally to wireless communication, and more specifically to a demodulation reference signal (DMRS) configuration for a shortened transmission time interval (sTTI) baseline pattern.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station may communicate with a UE during shortened transmission time intervals (sTTIs) on resources of a carrier. The base station may transmit control information to the UE in a shortened physical downlink control channel (sPDCCH) during an sTTI, and the base station may transmit data to the UE in a shortened physical downlink shared channel (sPDSCH) during the sTTI. The base station may also transmit reference signals, such as channel state information reference signal (CSI-RS) data, cell-specific reference signal (CRS) data, or demodulation reference signal (DMRS) data, within one or more sTTIs, which the UE may use to perform channel estimation to demodulate the data carried on the sPDSCH during the sTTI. The base station may map reference signals (e.g., DMRS) to resource elements (REs) within an sTTI so as to avoid collision with (e.g., avoid mapping to a same RE as) other reference signals that the sTTI may be configured to include, such as CSI-RS or CRS. Techniques for providing a mapping configuration corresponding to different reference signals within an sTTI may be desirable.

SUMMARY

The described techniques relate to improved methods, systems, devices, and apparatuses that support a demodulation reference signal (DMRS) configuration for shortened transmission time interval (sTTI) baseline pattern. A base station may identify a baseline DMRS mapping pattern for mapping of DMRS data to REs within a sTTI based at least in part on a number of layers for which a user equipment (UE) is configured. The number of layers may be configured on a per-unit basis, for example, on a per-UE basis, on a per-frequency band basis, on a per-component carrier basis, or a combination thereof. The number of layers may also be configured based on whether the DMRS mapping pattern is for a subslot or for a slot. The base station may determine a shifted DMRS mapping pattern based at least in part on the baseline DMRS mapping pattern and a reference signal configuration associated with reference signals other than a DMRS, and configure REs within the sTTI according to the shifted DMRS mapping pattern. The base station may transmit the configured REs to the UE.

A method of wireless communications is described. The method may include identifying a baseline DMRS mapping pattern for mapping of DMRS data to REs within a sTTI based on a number of layers for which the apparatus is configured, where the number of layers is configured on a per-unit basis, determining a shifted DMRS mapping pattern based on the baseline DMRS mapping pattern and a reference signal configuration associated with reference signals other than a DMRS, configuring REs within the sTTI according to the shifted DMRS mapping pattern, and transmitting the configured REs.

An apparatus for wireless communications is described. The apparatus may include a processor, memory in electronic communication with the processor, and instructions stored in the memory. The instructions may be executable by the processor to cause the apparatus to identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, configure REs within the sTTI according to the shifted DMRS mapping pattern, and transmit the configured REs.

Another apparatus for wireless communications is described. The apparatus may include means for identifying a baseline DMRS mapping pattern for mapping of DMRS data to REs within a sTTI based on a number of layers for which a UE is configured, where the number of layers is configured on a per-unit basis, determining a shifted DMRS mapping pattern based on the baseline DMRS mapping pattern and a reference signal configuration associated with reference signals other than a DMRS, configuring REs within the sTTI according to the shifted DMRS mapping pattern, and transmitting the configured REs.

A non-transitory computer-readable medium storing code for wireless communications is described. The code may include instructions executable by a processor to identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, configure REs within the sTTI according to the shifted DMRS mapping pattern, and transmit the configured REs.

In some examples of the method, apparatuses, and non-transitory computer-readable medium described herein, identifying the baseline DMRS mapping pattern may include operations, features, means, or instructions for identifying a subslot baseline DMRS mapping pattern, where the number of layers may be configured on a per-component carrier basis.

Some examples of the method, apparatuses, and non-transitory computer-readable medium described herein may further include operations, features, means, or instructions for indicating the number of layers to the UE in connection with configuration of the UE for a subslot physical downlink shared channel (PDSCH).

In some examples of the method, apparatuses, and non-transitory computer-readable medium described herein, identifying the baseline DMRS mapping pattern may include operations, features, means, or instructions for identifying a subslot baseline DMRS mapping pattern, where the number of layers may be configured on a per-UE basis.

Some examples of the method, apparatuses, and non-transitory computer-readable medium described herein may further include operations, features, means, or instructions for indicating the number of layers to the UE such that the number of layers may be identical across all component carriers for which the UE may be configured.

In some examples of the method, apparatuses, and non-transitory computer-readable medium described herein, identifying the baseline DMRS mapping pattern may include operations, features, means, or instructions for identifying a subslot baseline DMRS mapping pattern, where the number of layers may be configured on a per-frequency band basis.

Some examples of the method, apparatuses, and non-transitory computer-readable medium described herein for may further include operations, features, means, or instructions for indicating the number of layers to the UE such that the number of layers may be identical across all component carriers within the frequency band.

Some examples of the method, apparatuses, and non-transitory computer-readable medium described herein for where identifying the baseline DMRS mapping pattern may further include operations, features, means, or instructions for identifying a subslot baseline DMRS mapping pattern for a shortened physical downlink control channel (sPDCCH) based on the number of layers configured for a subslot baseline DMRS mapping pattern for a shortened physical downlink shared channel (sPDSCH).

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH based on the number of layers configured for a subslot baseline DMRS mapping pattern.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured to be one by default.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-component carrier basis.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-UE basis.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-frequency band basis.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-serving cell basis.

Some examples of the method, apparatuses, and non-transitory computer-readable medium described herein may further include operations, features, means, or instructions for signaling the number of layers via radio resource control (RRC) signaling.

Some examples of the method, apparatuses, and non-transitory computer-readable medium described herein may further include operations, features, means, or instructions for transmitting the actual number of layers to be used for DMRS data in a downlink control information (DCI).

A method of wireless communications is described. The method may include identifying a baseline DMRS mapping pattern for mapping of DMRS data to REs within a sTTI based on a number of layers for which a UE is configured, where the number of layers is configured on a per-unit basis, determining a shifted DMRS mapping pattern based on the baseline DMRS mapping pattern and a reference signal configuration associated with reference signals other than a DMRS, determining, based on the shifted DMRS mapping pattern, one or more REs within the sTTI to monitor for DMRS data, and monitoring the one or more REs for DMRS data.

An apparatus for wireless communications is described. The apparatus may include a processor, memory in electronic communication with the processor, and instructions stored in the memory. The instructions may be executable by the processor to cause the apparatus to identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, determine, based on the shifted DMRS mapping pattern, one or more REs within the sTTI to monitor for DMRS data, and monitor the one or more REs for DMRS data.

Another apparatus for wireless communications is described. The apparatus may include means for identifying a baseline DMRS mapping pattern for mapping of DMRS data to REs within a sTTI based on a number of layers for which a UE is configured, where the number of layers is configured on a per-unit basis, determining a shifted DMRS mapping pattern based on the baseline DMRS mapping pattern and a reference signal configuration associated with reference signals other than a DMRS, determining, based on the shifted DMRS mapping pattern, one or more REs within the sTTI to monitor for DMRS data, and monitoring the one or more REs for DMRS data.

A non-transitory computer-readable medium storing code for wireless communications is described. The code may include instructions executable by a processor to identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, determine, based on the shifted DMRS mapping pattern, one or more REs within the sTTI to monitor for DMRS data, and monitor the one or more REs for DMRS data.

In some examples of the method, apparatuses, and non-transitory computer-readable medium described herein, identifying the baseline DMRS mapping pattern may include operations, features, means, or instructions for identifying a subslot baseline DMRS mapping pattern, where the number of layers may be configured on a per-component carrier basis.

Some examples of the method, apparatuses, and non-transitory computer-readable medium described herein may further include operations, features, means, or instructions for receiving an indication of the number of layers in connection with a configuration of the UE for a subslot PDSCH.

In some examples of the method, apparatuses, and non-transitory computer-readable medium described herein, identifying the baseline DMRS mapping pattern may include operations, features, means, or instructions for identifying a subslot baseline DMRS mapping pattern, where the number of layers may be configured on a per-UE basis.

Some examples of the method, apparatuses, and non-transitory computer-readable medium described herein may further include operations, features, means, or instructions for receiving an indication of the number of layers such that the number of layers may be identical across all component carriers for which the UE may be configured.

In some examples of the method, apparatuses, and non-transitory computer-readable medium described herein, identifying the baseline DMRS mapping pattern may include operations, features, means, or instructions for identifying a subslot baseline DMRS mapping pattern, where the number of layers may be configured on a per-frequency band basis.

Some examples of the method, apparatuses, and non-transitory computer-readable medium described herein may further include operations, features, means, or instructions for receiving an indication of the number of layers such that the number of layers may be identical across all component carriers within the frequency band.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured to be one by default.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured to be one by default.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH based on the number of layers configured for a subslot baseline DMRS mapping pattern.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-component carrier basis.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-UE basis.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-frequency band basis.

In some examples of the method, apparatuses, and non-transitory computer-readable medium described herein, identifying the baseline DMRS mapping pattern may include operations, features, means, or instructions for identifying a slot baseline DMRS mapping pattern for an sPDCCH, where the number of layers may be configured on a per-serving cell basis.

Some examples of the method, apparatuses, and non-transitory computer-readable medium described herein may further include operations, features, means, or instructions for receiving an indication of the number of layers via RRC signaling.

Some examples of the method, apparatuses, and non-transitory computer-readable medium described herein may further include operations, features, means, or instructions for receiving the actual number of layers to be used for DMRS data in a DCI.

DETAILED DESCRIPTION

A base station may identify a baseline demodulation reference signal (DMRS) mapping pattern for mapping of DMRS data to resource elements (REs) within a shortened transmission time interval (sTTI) based at least in part on a number of layers for which a user equipment (UE) is configured. The number of layers is configured on a per-unit basis, for example, on a per-UE basis, on a per-frequency band basis, on a per-component carrier basis, on a per-serving cell basis, or a combination thereof. The number of layers may also be configured based on whether the DMRS data is to be mapped to a subslot or to a slot. The base station may determine a shifted DMRS mapping pattern based at least in part on the baseline DMRS mapping pattern and a reference signal configuration associated with reference signals other than a DMRS, and configure REs within the sTTI according to the shifted DMRS mapping pattern. The base station may transmit the configured REs to a UE.

A UE may, additionally, or alternatively, identify a baseline DMRS mapping pattern for mapping of DMRS data to REs within a sTTI based at least in part on a number of layers for which a UE is configured, determine a shifted DMRS mapping pattern based at least in part on the baseline DMRS mapping pattern and a reference signal configuration associated with reference signals other than a DMRS, and based at least in part on the shifted DMRS mapping pattern, one or more REs within the sTTI to monitor for DMRS data. The UE may monitor the one or more REs for DMRS data.

Aspects of the disclosure are initially described in the context of a wireless communications system. Aspects of the disclosure are further illustrated by and described with reference to process flows, apparatus diagrams, system diagrams, and flowcharts that relate to DMRS configuration for sTTI baseline pattern.

Figure 1:
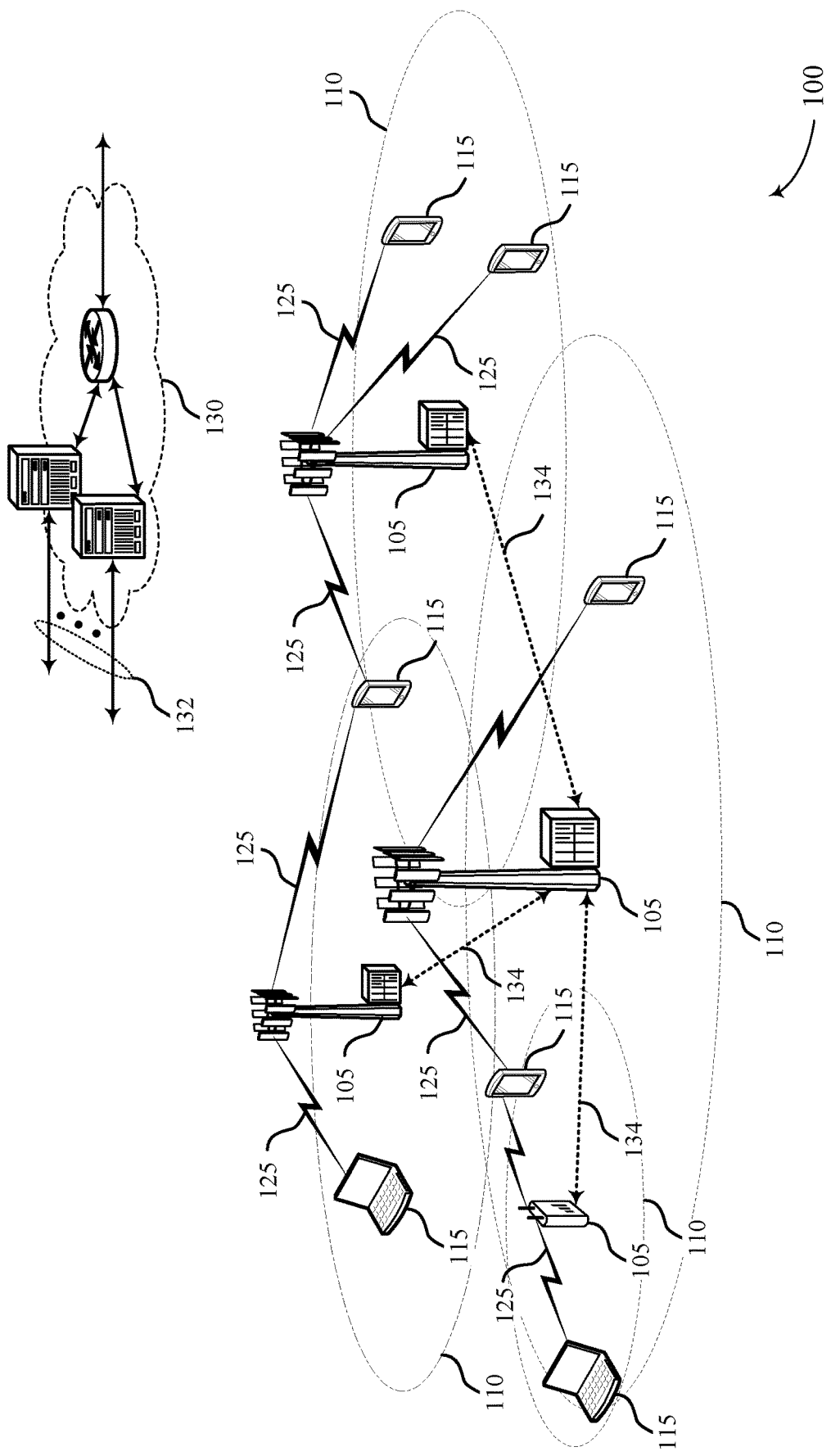
FIGS. 1 and 2 illustrate examples of a wireless communications system that supports demodulation reference signal (DMRS) configuration for shortened transmission time interval (sTTI) baseline pattern in accordance with aspects of the present disclosure.

FIG. 1 illustrates an example of a wireless communications system 100 that supports DMRS configuration for sTTI baseline pattern in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of sTTIs or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may identify a baseline DMRS mapping pattern for mapping of DMRS data to REs within a sTTI based at least in part on a number of layers for which a UE 115 is configured. The number of layers is configured on a per-unit basis, for example, on a per-UE basis, on a per-frequency band basis, on a per-component carrier basis, on a per-serving cell basis, or a combination thereof. The base station 105 may determine a shifted DMRS mapping pattern based at least in part on the baseline DMRS mapping pattern and a reference signal configuration associated with reference signals other than a DMRS, and configure REs within the sTTI according to the shifted DMRS mapping pattern. The base station 105 may transmit the configured REs to a UE 115.

The UE 115 may, additionally, or alternatively, identify a baseline DMRS mapping pattern for mapping of DMRS data to REs within a sTTI based at least in part on a number of layers for which a UE 115 is configured, determine a shifted DMRS mapping pattern based at least in part on the baseline DMRS mapping pattern and a reference signal configuration associated with reference signals other than a DMRS, and based at least in part on the shifted DMRS mapping pattern, one or more REs within the sTTI to monitor for DMRS data. The UE 115 may monitor the one or more REs for DMRS data.

Figure 2:
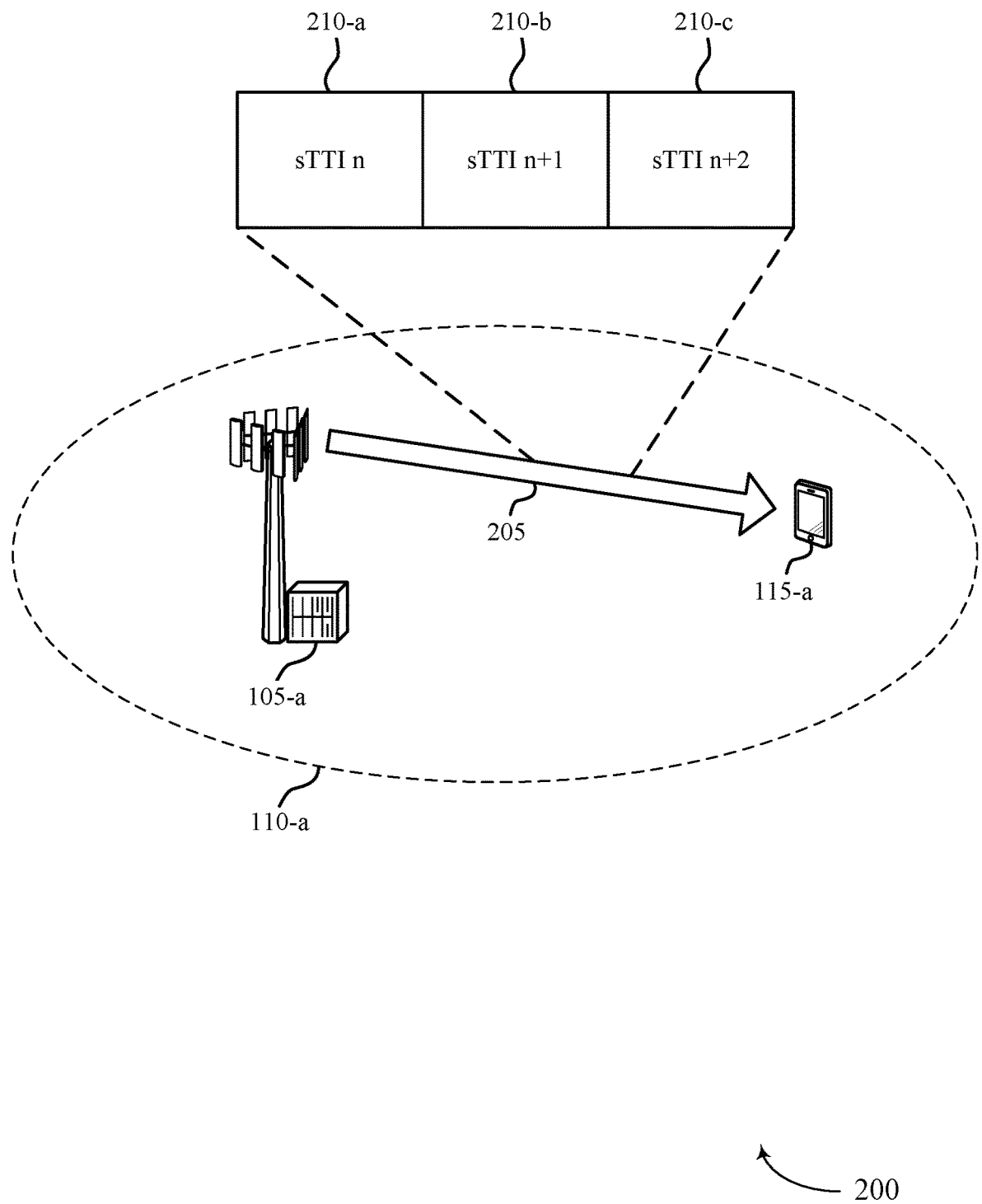

FIG. 2 illustrates an example of a wireless communications system 200 that supports a DMRS configuration for an sTTI baseline pattern in accordance with various aspects of the present disclosure. The wireless communications system 200 includes a base station 105-*a* and a UE 115-*a*, which may be examples of the corresponding devices described with reference to FIG. 1. The wireless communications system 200 may implement aspects of the wireless communications system 100. The base station 105-*a* may communicate with the UE 115-*a* within a coverage area 110-*a*.

The base station 105-*a* may, in some examples, perform a communication procedure (e.g., a RRC procedure, such as a cell acquisition procedure, random access procedure, RRC connection procedure, RRC configuration procedure) with the UE 115-*a*. The base station 105-*a* may be configured with multiple antennas, which may be used for directional or beamformed transmissions. As part of the communication procedure, the base station 105-*a* may select a carrier and communicate with the UE 115-*a* on resources of a carrier during a TTI (also referred to herein as a slot) or an sTTI (also referred to herein as a subslot). For example, the base station 105-*a* may communicate with the UE 115-*a* on resources of a carrier 205 during one or more sTTI 210. Additionally, or alternatively, as part of the communication procedure, the base station 105-*a* may configure the UE 115-*a* through downlink transmissions (e.g., higher-layer signaling, RRC signaling), as part of the communication procedure. For example, the base station 105-*a* may configure the UE 115-*a* with a DMRS configuration for an sTTI baseline DMRS pattern including resource allocation (e.g., time and frequency resources).

A TTI or an sTTI may be part of a resource grid that may correspond to a system bandwidth that the base station 105-*a* may allocate to the UE 115-*a*. An RE in a resource grid may span one symbol by one sub-carrier. Each RE may carry two, four or six physical channel bits. REs may be grouped into RBs, each of which may span 180 kHz (e.g., 12 sub-carriers). The base station 105-*a* may allocate RBs to the UE 115-*a*, by allocating the symbols and sub-carriers within each TTI or sTTI in units of RBs to the UE 115-*a*. Each TTI or sTTI may span a number of modulation symbol periods (e.g., 0-14 OFDM symbols) and a number of sub-carriers within a bandwidth.

In some examples, the base station 105-*a* may configure the UE 115-*a* with a DMRS configuration and resource allocation based on a reported UE capability. The UE 115-*a* may, in some examples, identify and report its UE capabilities, so that the base station 105-*a* can determine a DMRS configuration for the UE 115-*a*. In some examples, the base station 105-*a* may receive UE capability reporting per UE, per band, and/or per CC.

The base station 105-*a* may transmit configuration information indicating the DMRS configuration and resource allocation in a downlink transmission to the UE 115-*a* via on resources of the carrier 205. For example, the base station 105-*a* may transmit downlink control information (DCI) on a shortened physical control channel (sPDCCH). In some examples, the base station 105-*a* may transmit UE-specific scheduling assignments for downlink resource allocation, uplink grants, uplink power control commands, and common scheduling assignments for signaling messages on the sPDCCH. The base station 105-*a* may transmit the configuration information during one or more symbols within a given a TTI or an sTTI (e.g., a TTI that is shorter than a standard TTI). For example, the base station 105-*a* may transmit control information to the UE 115-*a* in an sPDCCH in an sTTI 210 including the DMRS configuration, and the base station 105-*a* may transmit data to the UE 115-*a* in a shortened physical downlink shared channel (sPDSCH) in the sTTI 210.

Figure 3:
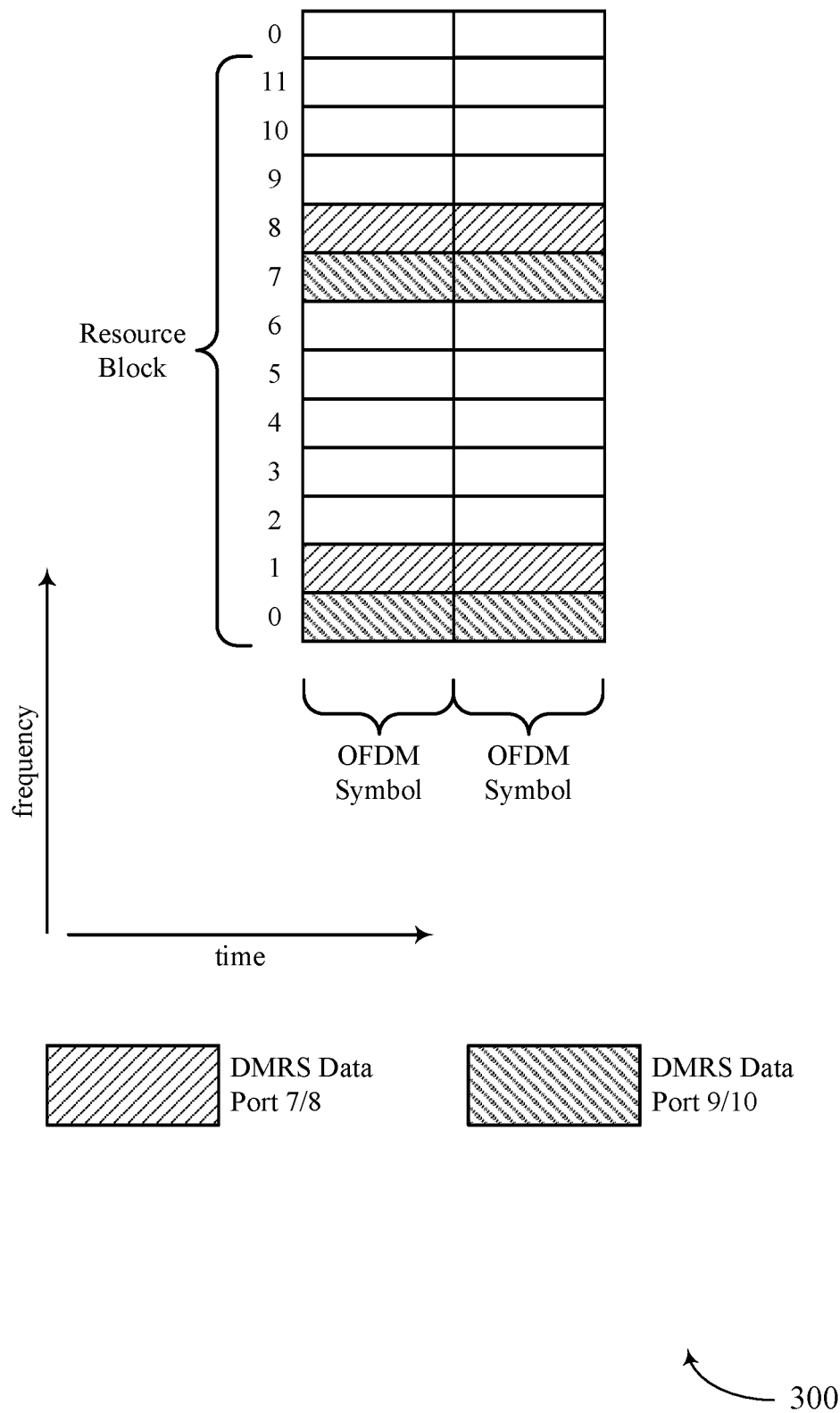
FIG. 3 illustrates an example of a DMRS mapping pattern that supports DMRS configuration for sTTI baseline pattern in accordance with aspects of the present disclosure.

FIG. 3 illustrates an example of a DMRS mapping pattern 300 that supports DMRS configuration for sTTI baseline pattern in accordance with various aspects of the present disclosure. In some examples, the DMRS mapping pattern 300 may be implemented by aspects of the wireless communication system 100 and/or the wireless communication system 200.

A base station may identify the baseline DMRS mapping pattern 300 for mapping of DMRS to REs within an sTTI based on a number of layers for which a UE 115 may be configured. In some examples, the number of layers for the baseline DMRS mapping pattern 300 may be configured on a per-unit basis. In some examples, a number of layers used for data/control (e.g., sPDCCH, sPDSCH) transmission may be different from those configured for the baseline DMRS mapping pattern 300. The baseline DMRS mapping pattern 300 may define resource for up to N layers, where N is an integer and configured. The number of antenna ports for data is given by DCI, and may be smaller or equal to N. In case of control, the number of layers may be 1 (i.e., N may be 1), but N could be 1 or larger than 1. A base station 105 may signal the number of layers via RRC signaling.

The DMRS mapping pattern 300 may define REs over two consecutive symbols to which a base station 105 is to map DMRS data. Within a symbol allocated to DMRS data, the DMRS mapping pattern 300 may map DMRS data for one antenna port pair (e.g., port 7/8) to REs 1 and 8 of a frequency in a RB; the DMRS mapping pattern 300 may also map DMRS data for another antenna port pair (e.g., port 9/10) to REs 0 and 7 of another or same frequency in the RB. In some examples, the DMRS mapping pattern 300 may correspond to one or more sTTI.

A UE 115 may receive the indication and monitor the one or more REs for DMRS data. In some cases, a UE 115 may also identify the baseline DMRS mapping pattern 300 for mapping of DMRS data to REs within a sTTI based at least in part on a number of layers for which the UE 115 is configured. The configured number of layers for the baseline DMRS mapping pattern 300 may be different from the number of layers used for sPDSCH. As such, the number of layers may be explicitly for the baseline DMRS mapping pattern 300 and not the sPDSCH or an sPDCCH. In some cases, the first number of layers may be used to derive resources used for each of the ports (e.g., port 7/8/9/10). A second number of layers may then be indicated by a base station 105 via DCI, and a UE 115 may monitor the corresponding resources (e.g., REs) obtained from the first number of layers for the ports indicated in the second number of layers.

For a TTI, positions of DMRS data may depend on collisions between the DMRSs in a baseline DMRS mapping pattern and other reference signals such as cell-specific reference signal (CRS) and channel state information reference signal (CSI-RS). The DMRS mapping pattern 300 may represent a baseline DMRS mapping pattern. A base station 105 may use the DMRS mapping pattern 300 when, for example, a subframe is not configured to include any CSI-RS and an sTTI is not configured to include any CRS. For a subslot sPDCCH transmission, the DMRS data may follow a same baseline DMRS mapping pattern as that for a subslot sPDSCH transmission during a same sTTI. The DMRS mapping pattern of the slot sPDCCH may also follow the subslot PDSCH DMRS mapping pattern.

In some cases, a base station 105 may determine whether an sTTI is configured to include any CRS based at least in part on a type of the subframe that includes the sTTI. For example, it may be preconfigured that multicast-broadcast single-frequency network (MBSFN) subframes are not to include any CRS. Because the subslot DMRS mapping pattern depends on a subframe type (e.g., MBSFN vs. non-MBSFN), the DMRS mapping pattern of a slot sPDCCH may also be subframe type dependent.

A base station 105 may determine a shifted DMRS mapping pattern based on a baseline DMRS mapping pattern and a reference signal configuration associated with reference signals other than a DMRS. For example, the DMRS mapping pattern 300 may represent a DMRS mapping pattern in which the DMRS for one antenna port pair (e.g., port 7/8) is shifted in the RB; the DMRS mapping pattern 300 may also shift DMRS for another antenna port pair (e.g., port 9/10) in the RB. A base station 105 may configure REs within the sTTI according to the shifted DMRS mapping pattern, and transmit the configured REs to a UE 115. In some examples, a base stations 105 may be configured to transmit DMRS at different frequencies of the RB in order to avoid interference between DMRS transmissions of neighboring cells. Additionally, or alternatively, the DMRS mapping pattern 300 may include a DMRS mapping pattern for cells in which shifts for CRS is transmitted. For example, a base stations 105 may be configured to transmit CRS at different frequencies of the RB in order to avoid interference between CRS transmissions of neighboring cells.

A DMRS mapping pattern may be derived for a subslot PDSCH, subslot PDCCH and slot PDCCH based at least in part on a 4-layer baseline DMRS pattern (e.g., the DMRS baseline pattern 300) and other reference signals in MBSFN and non-MBSFN subframes. The DMRS mapping pattern 300 may represent a baseline DMRS mapping pattern. In some examples of wireless communications systems, a DMRS baseline pattern may be presumed to always have 4 ports (e.g., port 7/8 and port 9/10). The determination of the shifted DMRS mapping pattern may be based at least in part on the collision between a number of configured layers for a UE 115 and other reference signal types. Hence, the baseline DMRS mapping pattern may not always be a 4-port DMRS pattern, because shifting the DMRS mapping pattern may be undesirable based on a 4-port baseline DMRS mapping pattern. For example, a UE 115 may only be scheduled with 1/2 layer subslot PDSCH. In this example, the third and fourth ports may not be even present. As such, the DMRS mapping pattern and therefore the determination on whether DMRS collides with other reference signal may be dependent on the configuration, and could be different for different UEs 115.

A base station 105 may determine a configuration for a subslot baseline DMRS mapping pattern according to UE capability. In some cases, a base station 105 may determine a DMRS configuration per-CC. For example, a base station 105 may identify a subslot baseline DMRS mapping pattern, and the number of layers may be configured on a per-CC basis. When the base station 105 configures a UE 115 for a subslot PDSCH on a given cell, a number of layers (e.g., ports) assumed for a baseline DMRS mapping pattern may also be indicated to the UE 115. This may be useful for UEs supporting up to a 4-layer sPDSCH, such UEs may be scheduled with 1/2-layer sPDSCH or 3/4-layer sPDSCH. For example, a base station 105 may indicate the number of layers to a UE in connection with configuration of the UE for a subslot PDSCH.

In some cases, a base station 105 may determine a DMRS configuration on a per-UE basis. For example, the number of layers for a baseline DMRS mapping pattern may be indicated for a given UE 115 and may be identical across all CCs for which the UE 115 is configured. Additionally, or alternatively, a base station 105 determine a DMRS configuration on a per-frequency band basis. For example, for all CCs within a given frequency band supported by a given UE 115, the number of layers may be configured. A base station 105 may indicate the number of layers to a UE 115 such that the number of layers is identical across all component carriers within the frequency band.

In some cases, a UE 115 may only support or be configured to operate within a slot (e.g., TTI). As such, a base station 105 may determine a configuration for a slot sPDCCH baseline DMRS mapping pattern. In some examples, a base station 105 may determine the configuration for the slot sPDCCH based on a number of layers configured for a subslot baseline DMRS mapping pattern. In some examples, the number of layers may be configured to be one by default. For example, since sPDCCH is a single-port channel, a base station 105 may consider a 1-layer baseline DMRS pattern and its shifted versions depending on the collision with other reference signals.

In some cases, a base station 105 may determine a configuration for a slot sPDCCH baseline DMRS mapping pattern based at least in part on a per-CC basis, per-UE basis, or a per-frequency band basis, or a combination thereof. As such, the number of layers for a slot sPDCCH baseline DMRS mapping pattern may be configured based at least in part on a per-CC basis, per-UE basis, or a per-frequency band basis, or a combination thereof.

Figure 4:
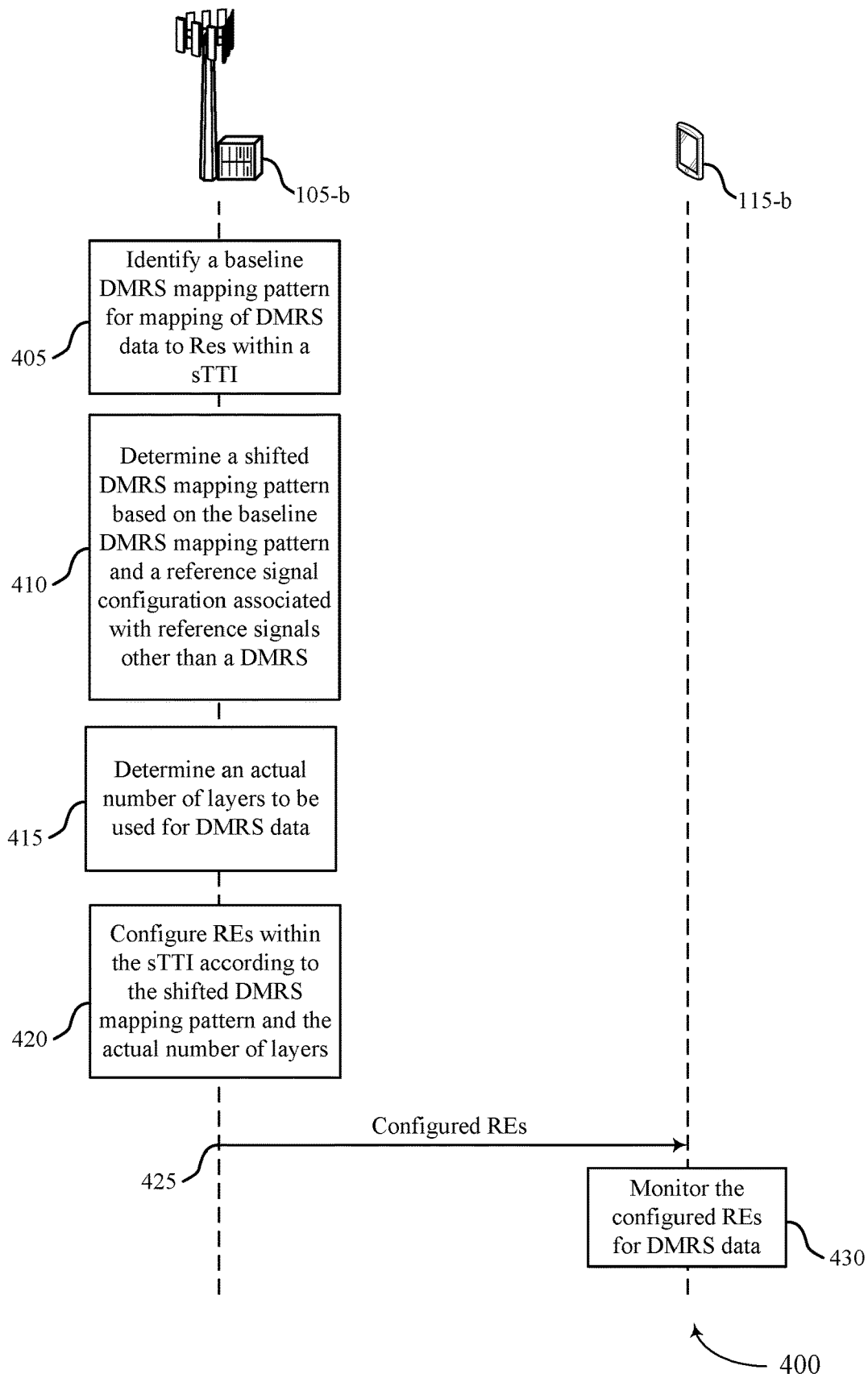
FIG. 4 illustrates an example of a process flow that supports DMRS configuration for sTTI baseline pattern in accordance with aspects of the present disclosure.

FIG. 4 illustrates an example of a process flow 400 that supports DMRS configuration for sTTI baseline pattern in accordance with aspects of the present disclosure. In some examples, the process flow 400 may implement aspects of the wireless communications systems 100 and 200. Base station 105-*b* and UE 115-*b* may be examples of the corresponding devices described with reference to FIGS. 1 and 2.

In the following description of the process flow 300, the operations between the base station 105-*b* and the UE 115-*b* may be transmitted in a different order than the exemplary order shown, or the operations performed by the base station 105-*b* and the UE 115-*b* may be performed in different orders or at different times. Certain operations may also be left out of the process flow 300, or other operations may be added to the process flow 300.

In some examples, the process flow 300 may commence with the base station 105-*b* establishing a connection with the UE 115-*b* (e.g., performing a cell acquisition procedure, a random access procedure, an RRC connection procedure, an RRC configuration procedure).

At 405, the base station 105-*b* may identify a baseline DMRS mapping pattern for mapping of DMRS data to REs within a sTTI. For example, the base station 105-*b* may identify the baseline DMRS mapping pattern based at least in part on a number of layers for which the UE 115-*b* is configured. The number of layers may be configured on a per-unit basis. For example, number of layers may be configured on a per-UE basis, on a per-frequency band basis, on a per-component carrier basis, on a per-serving cell basis, or a combination thereof.

At 410, the base station 105-*b* may determine a shifted DMRS mapping pattern based at least in part on the baseline DMRS mapping pattern and a reference signal configuration associated with reference signals other than a DMRS.

At 415, the base station 105-*b* may determine an actual number of layers to be used for DMRS data. In some examples, the actual number of layers is equal to or less than the number of layers identified for the baseline DMRS mapping pattern. At 420, the base station 105-*b* may configure REs within the sTTI according to the shifted DMRS mapping pattern and the actual number of layers.

At 425, the base station 105-*b* may transmit the configured REs to the UE 115-*b*. At 430, the UE 115-*b* may receive and monitor the configured REs for DMRS data.

Figure 5:
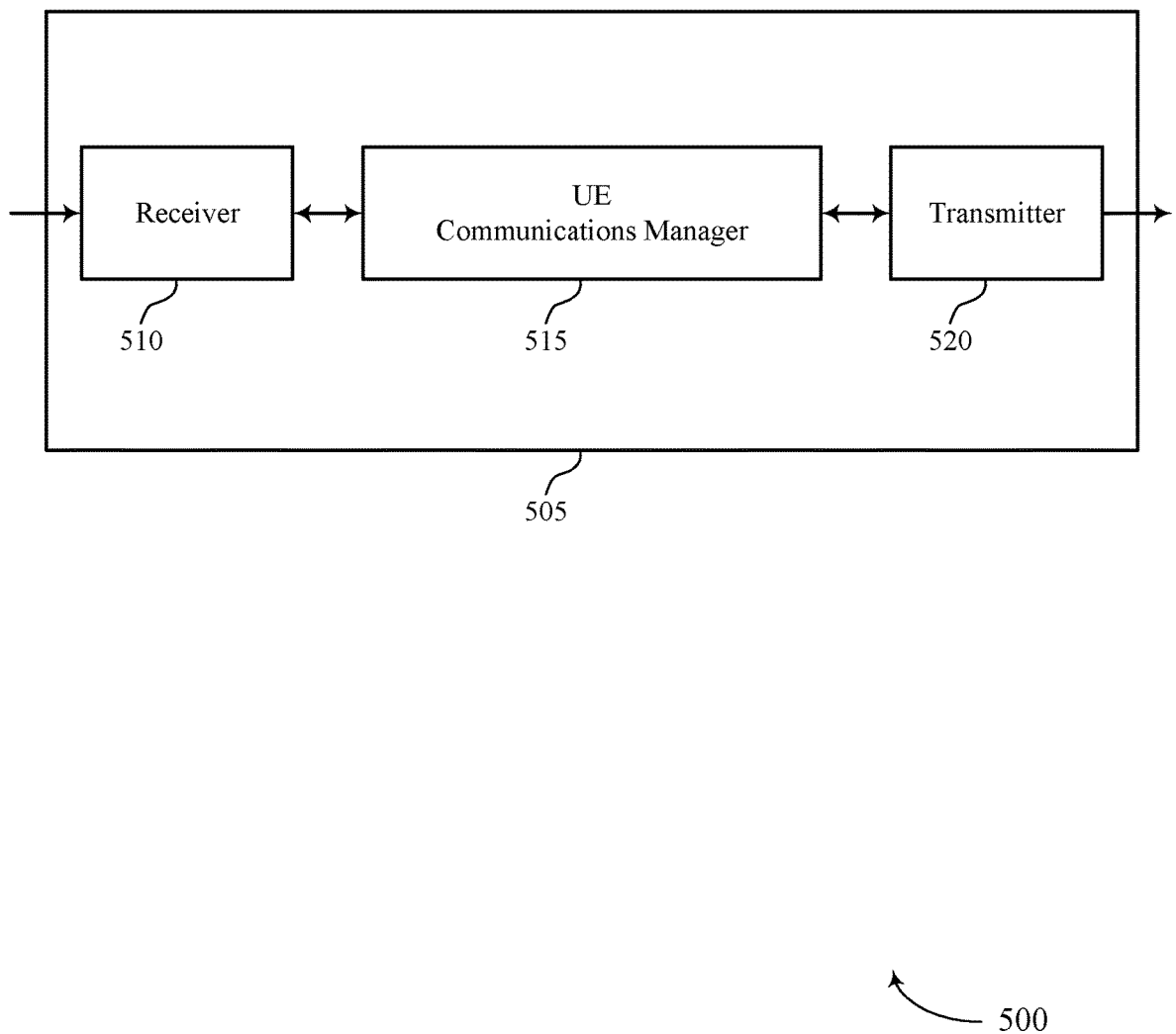
FIGS. 5 and 6 show block diagrams of devices that support DMRS configuration for sTTI baseline pattern in accordance with aspects of the present disclosure.

FIG. 5 shows a block diagram 500 of a device 505 that supports DMRS configuration for sTTI baseline pattern in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to DMRS configuration for sTTI baseline pattern, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, determine an actual number of layers to be used for DMRS data, the actual number of layers may be equal to or less than the number of layers identified for the baseline DMRS mapping pattern, determine, based on the shifted DMRS mapping pattern and the actual number of layers, one or more REs within the sTTI to monitor for DMRS data, and monitor the one or more REs for DMRS data. The UE communications manager 515 may be an example of aspects of the communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
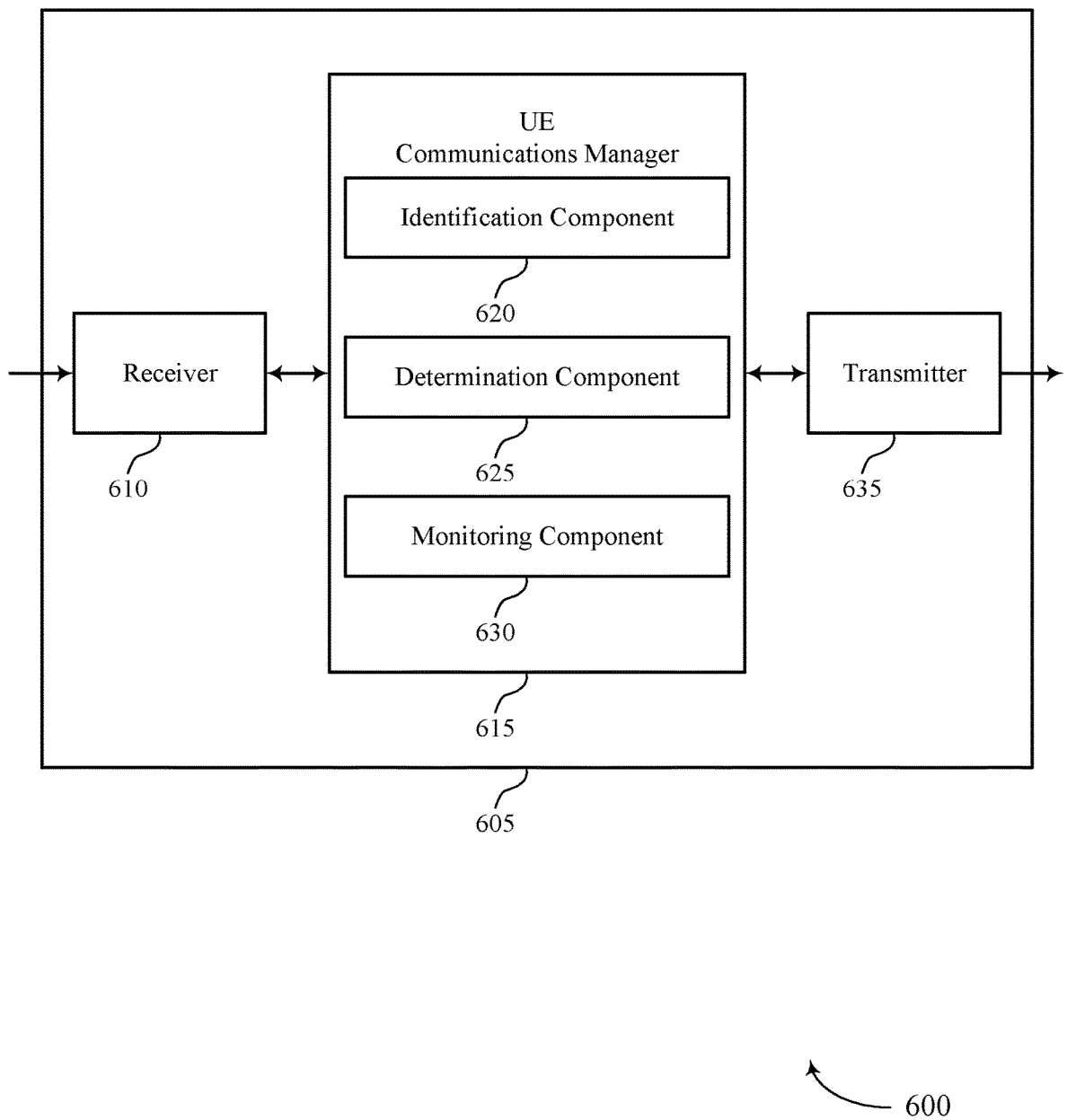

FIG. 6 shows a block diagram 600 of a device 605 that supports DMRS configuration for sTTI baseline pattern in accordance with aspects of the present disclosure. The device 605 may be an example of aspects of a device 505 or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to DMRS configuration for sTTI baseline pattern, etc.). Information may be passed on to other components of the device 605. The receiver 610 may be an example of aspects of the transceiver 820 described with reference to FIG. 8. The receiver 610 may utilize a single antenna or a set of antennas.

The receiver 610 may receive an indication of A number of layers in connection with a configuration of the UE for a subslot PDSCH. In some examples, the receiver 610 may receive an indication of a number of layers such that the number of layers is identical across all component carriers for which the UE is configured. In some examples, the receiver 610 may receive an indication of a number of layers such that the number of layers is identical across all component carriers within a frequency band. In some examples, the receiver 610 may receive an indication of the number of layers via RRC signaling. In some examples, the receiver 610 may receive the actual number of layers to be used for DMRS data in a DCI.

The UE communications manager 615 may be an example of aspects of the UE communications manager 515 as described herein. The UE communications manager 615 may include an identification component 620, a determination component 625, and a monitoring component 630. The UE communications manager 615 may be an example of aspects of the UE communications manager 810 described herein.

The identification component 620 may identify a baseline DMRS mapping pattern for mapping of DMRS data to REs within a sTTI based on a number of layers for which a UE is configured, where the number of layers is configured on a per-unit basis. The determination component 625 may determine a shifted DMRS mapping pattern based on the baseline DMRS mapping pattern and a reference signal configuration associated with reference signals other than a DMRS, determine an actual number of layers to be used for DMRS data, the actual number of layers may be equal to or less than the number of layers identified for the baseline DMRS mapping pattern, and determine, based on the shifted DMRS mapping pattern and the actual number of layers, one or more REs within the sTTI to monitor for DMRS data. The monitoring component 630 may monitor the one or more REs for DMRS data.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
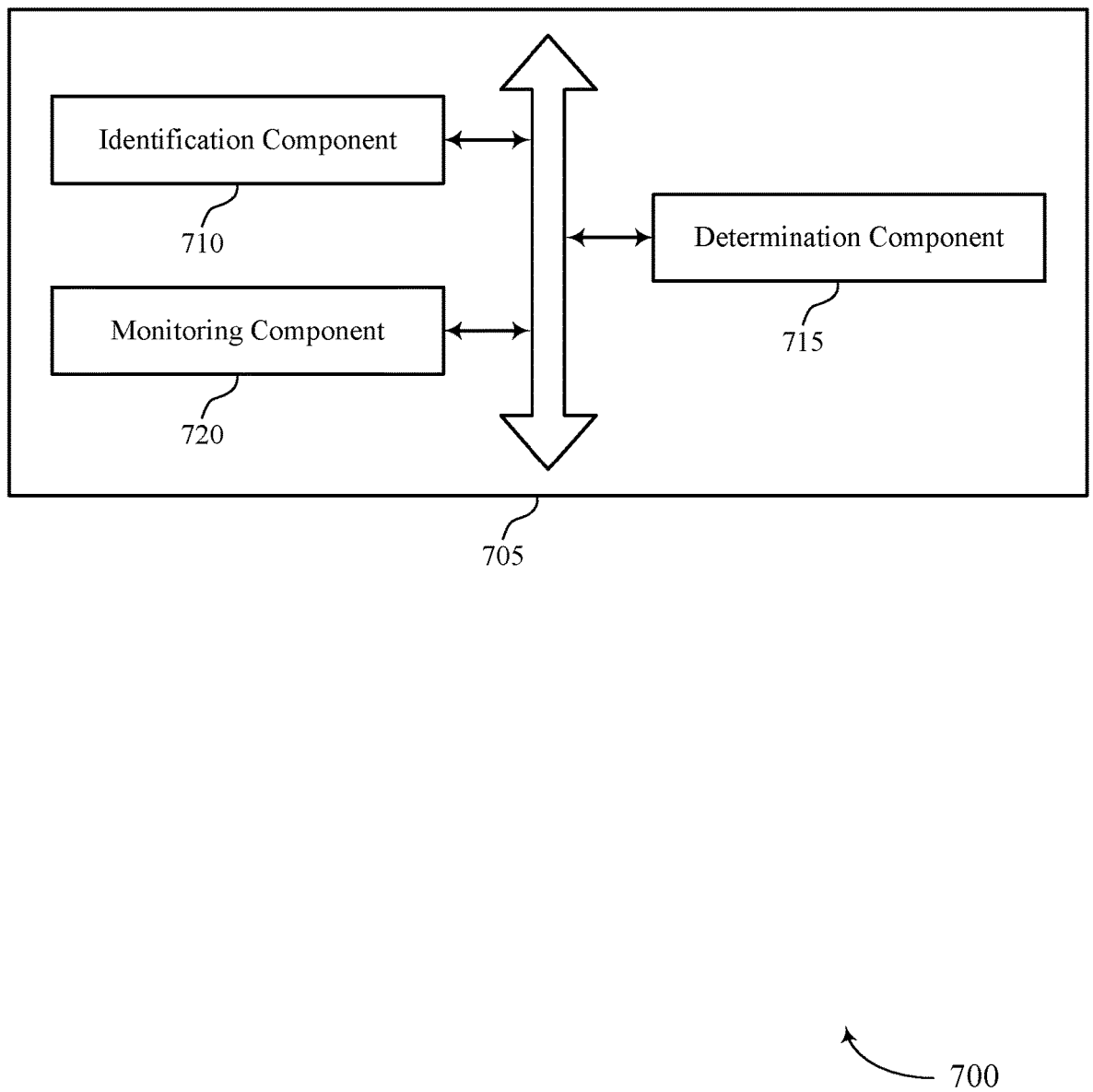
FIG. 7 shows a block diagram of a UE communications manager that supports DMRS configuration for sTTI baseline pattern in accordance with aspects of the present disclosure.

FIG. 7 shows a block diagram 700 of a communications manager 705 that supports DMRS configuration for sTTI baseline pattern in accordance with aspects of the present disclosure. The communications manager 705 may be an example of aspects of a UE communications manager 515, a UE communications manager 615, or a UE communications manager 810 described herein. The UE communications manager 705 may include an identification component 710, a determination component 715, and a monitoring component 720. Each of these modules may communicate, directly or indirectly, with one another (e.g., via one or more buses).

The identification component 710 may identify a baseline DMRS mapping pattern for mapping of DMRS data to REs within a sTTI based on a number of layers for which a UE is configured, where the number of layers is configured on a per-unit basis. In some examples, the number of layers is configured on a per-component carrier basis. In some examples, the number of layers is configured on a per-UE basis. In some examples, the number of layers is configured on a per-frequency band basis. In some examples, the number of layers is configured on a per-serving cell basis.

In some examples, the identification component 710 may identify a slot baseline DMRS mapping pattern for a sPDCCH, where the number of layers is configured to be one by default. In some examples, the identification component 710 may identify a slot baseline DMRS mapping pattern for an sPDCCH based on the number of layers configured for a subslot baseline DMRS mapping pattern. In some examples, the identification component 710 may identify a slot baseline DMRS mapping pattern for an sPDCCH, where the number of layers is configured on a per-component carrier basis. In some examples, the identification component 710 may identify a slot baseline DMRS mapping pattern for an sPDCCH, where the number of layers is configured on a per-UE basis. In some examples, the identification component 710 may identify a slot baseline DMRS mapping pattern for an sPDCCH, where the number of layers is configured on a per-frequency band basis. In some examples, the identification component 710 may identify a slot baseline DMRS mapping pattern for an sPDCCH, where the number of layers is configured on a per-serving cell basis. In some examples, the identification component 710 may identify a subslot baseline DMRS mapping pattern for an sPDCCH based on the number of layers configured for a subslot baseline DMRS mapping pattern for a sPDSCH.

The determination component 715 may determine a shifted DMRS mapping pattern based on the baseline DMRS mapping pattern and a reference signal configuration associated with reference signals other than a DMRS. In some examples, the determination component 715 may determine an actual number of layers to be used for DMRS data, the actual number of layers may be equal to or less than the number of layers identified for the baseline DMRS mapping pattern, and determine, based on the shifted DMRS mapping pattern and the actual number of layers, one or more REs within the sTTI to monitor for DMRS data.

Figure 8:
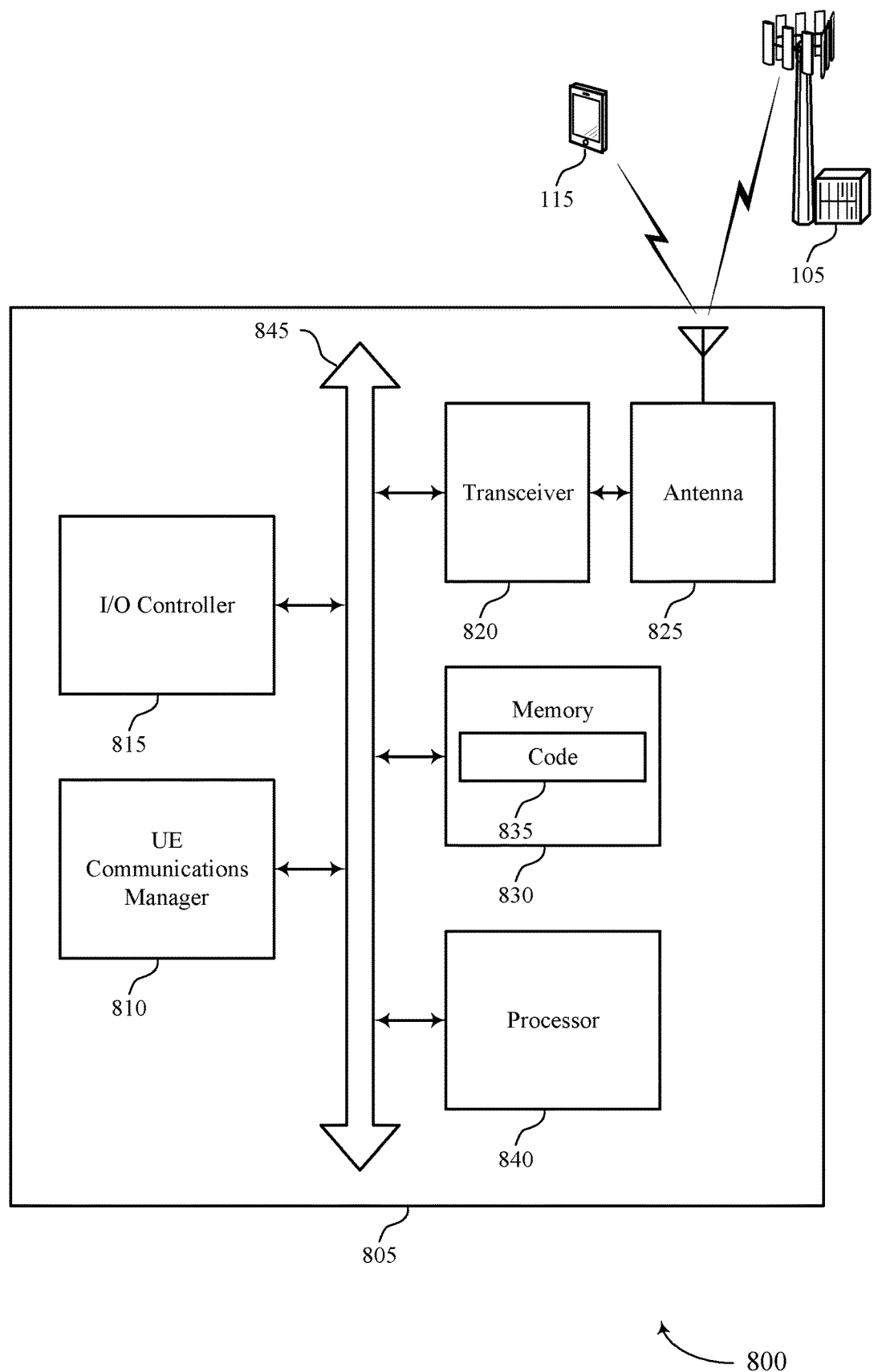
FIG. 8 shows a diagram of a system including a device that supports DMRS configuration for sTTI baseline pattern in accordance with aspects of the present disclosure.

FIG. 8 shows a diagram of a system 800 including a device 805 that supports DMRS configuration for sTTI baseline pattern in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, determine an actual number of layers to be used for DMRS data, the actual number of layers may be equal to or less than the number of layers identified for the baseline DMRS mapping pattern, determine, based on the shifted DMRS mapping pattern and the actual number of layers, one or more REs within the sTTI to monitor for DMRS data, and monitor the one or more REs for DMRS data.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting DMRS configuration for sTTI baseline pattern).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
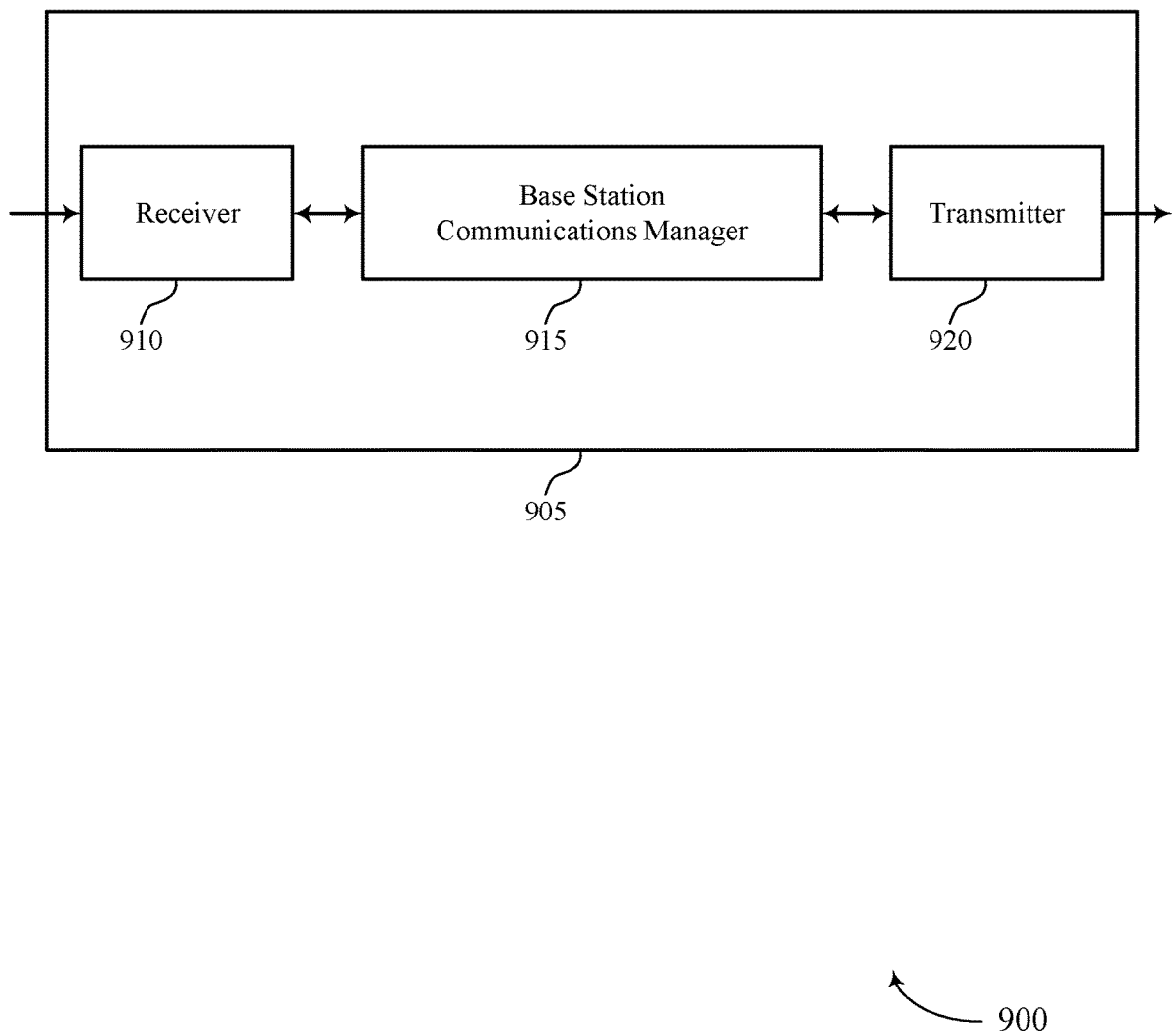
FIGS. 9 and 10 show block diagrams of devices that support DMRS configuration for sTTI baseline pattern in accordance with aspects of the present disclosure.

FIG. 9 shows a block diagram 900 of a device 905 that supports DMRS configuration for sTTI baseline pattern in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to DMRS configuration for sTTI baseline pattern, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, determine an actual number of layers to be used for DMRS data, the actual number of layers may be equal to or less than the number of layers identified for the baseline DMRS mapping pattern, configure REs within the sTTI according to the shifted DMRS mapping pattern and the actual number of layers, and transmit the configured REs. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
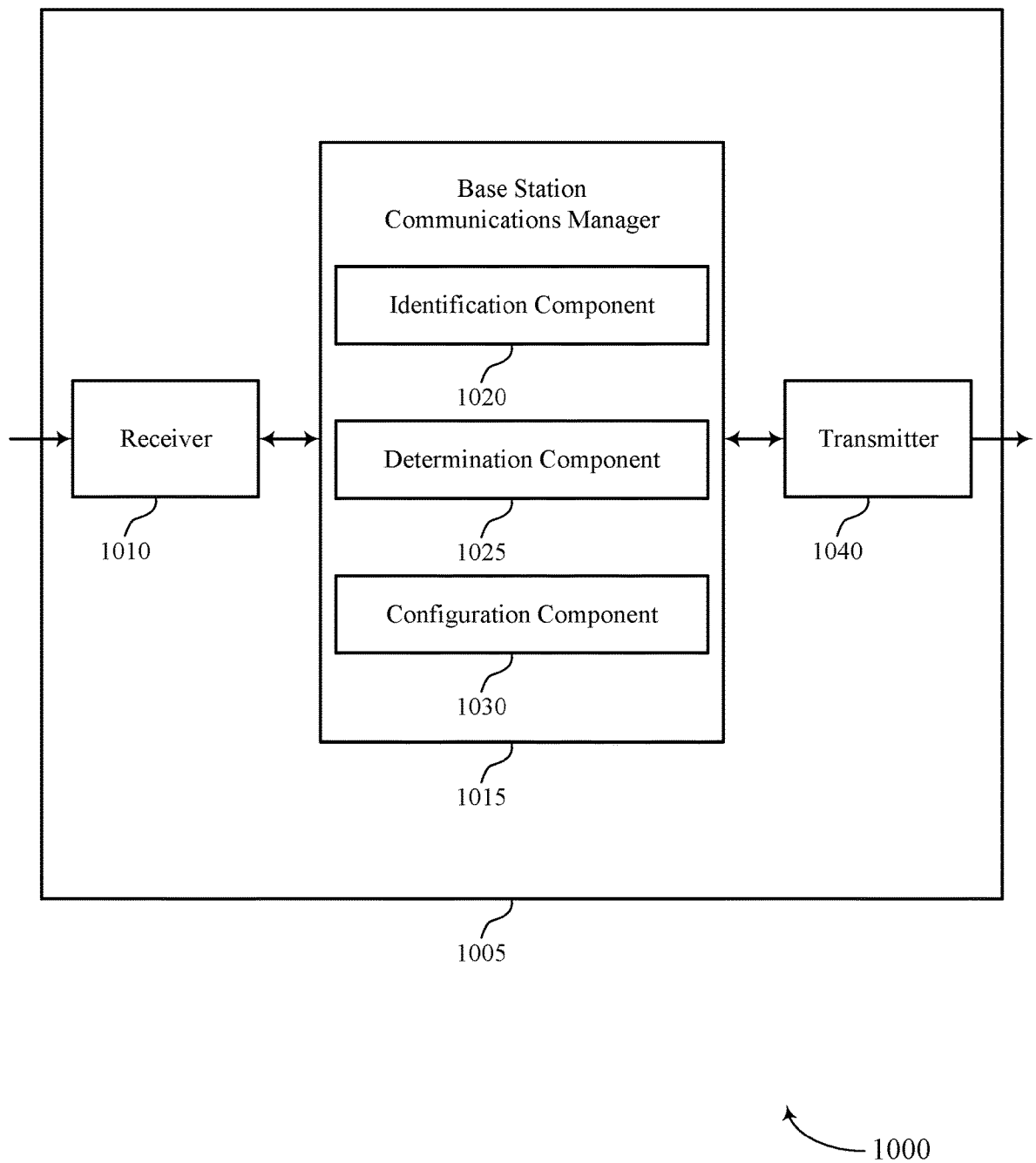

FIG. 10 shows a block diagram 1000 of a device 1005 that supports DMRS configuration for sTTI baseline pattern in accordance with aspects of the present disclosure. The device 1005 may be an example of aspects of a device 905 or a base station 115 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to DMRS configuration for sTTI baseline pattern, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include an identification component 1020, a determination component 1025, and a configuration component 1030. The base station communications manager 1015 may be an example of aspects of the base station communications manager 1210 described herein.

The identification component 1020 may identify a baseline DMRS mapping pattern for mapping of DMRS data to REs within a sTTI based on a number of layers for which a UE is configured, where the number of layers is configured on a per-unit basis. The determination component 1025 may determine a shifted DMRS mapping pattern based on the baseline DMRS mapping pattern and a reference signal configuration associated with reference signals other than a DMRS, and determine an actual number of layers to be used for DMRS data, the actual number of layers may be equal to or less than the number of layers identified for the baseline DMRS mapping pattern. The configuration component 1030 may configure REs within the sTTI according to the shifted DMRS mapping pattern and the actual number of layers.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas. The transmitter 1040 may transmit the configured REs.

Figure 11:
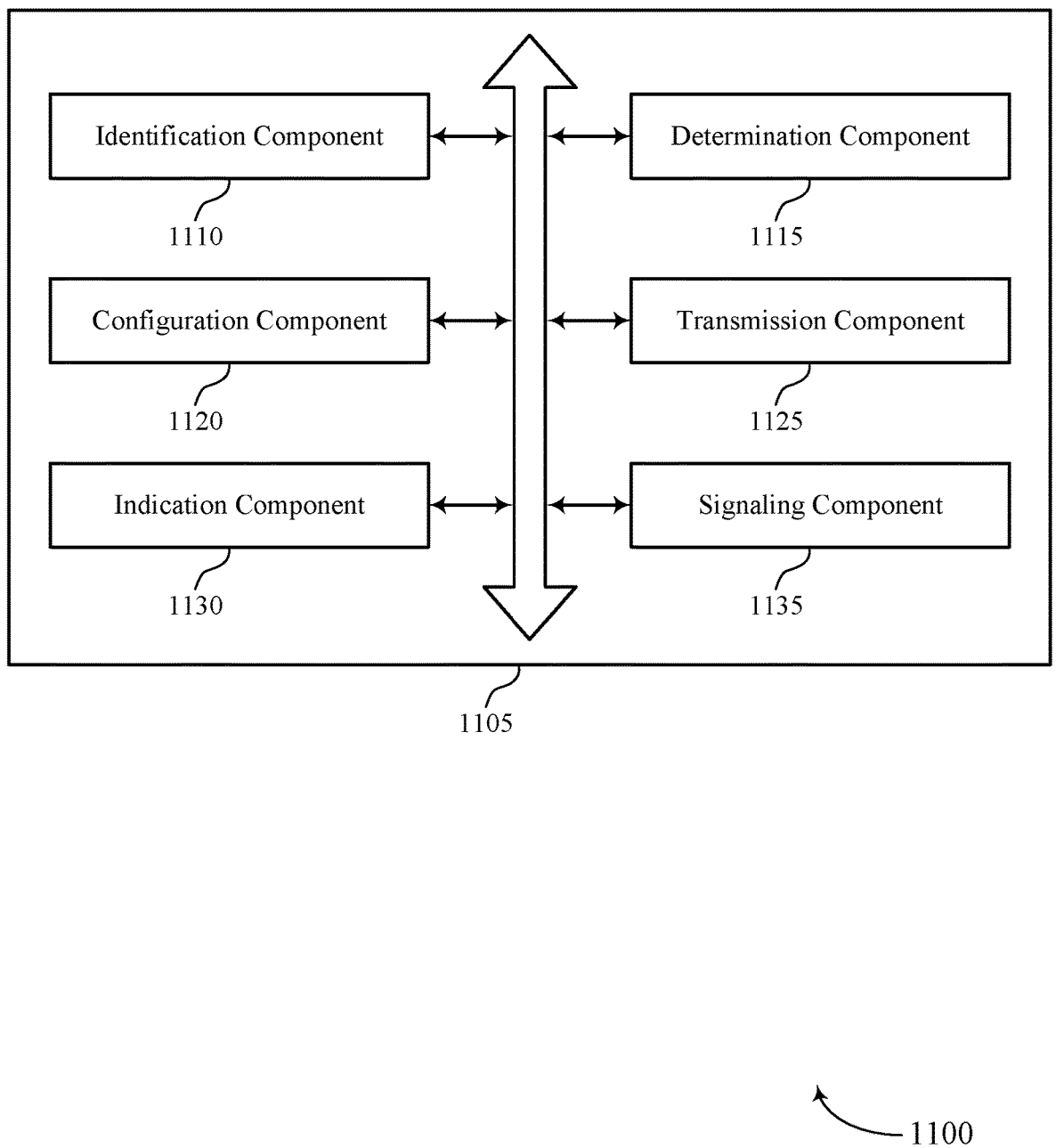
FIG. 11 shows a block diagram of a base station communications manager that supports DMRS configuration for sTTI baseline pattern in accordance with aspects of the present disclosure.

FIG. 11 shows a block diagram 1100 of a base station communications manager 1105 that supports DMRS configuration for sTTI baseline pattern in accordance with aspects of the present disclosure. The base station communications manager 1105 may be an example of aspects of a base station communications manager 915, a base station communications manager 1015, or a base station communications manager 1210 described herein. The base station communications manager 1105 may include an identification component 1110, a determination component 1115, a configuration component 1120, a transmitter 1125, an indication component 1130, and a signaling component 1135. Each of these modules may communicate, directly or indirectly, with one another (e.g., via one or more buses).

The identification component 1110 may identify a baseline DMRS mapping pattern for mapping of DMRS data to REs within a sTTI based on a number of layers for which a UE is configured, where the number of layers is configured on a per-unit basis. In some examples, the number of layers is configured on a per-component carrier basis. In some examples, the number of layers is configured on a per-UE basis. In some examples, the number of layers is configured on a per-frequency band basis. In some examples, the number of layers is configured on a per-serving cell basis.

In some examples, the identification component 1110 may identify a slot baseline DMRS mapping pattern for an sPDCCH based on the number of layers configured for a subslot baseline DMRS mapping pattern. In some examples, the identification component 1110 may identify a slot baseline DMRS mapping pattern for an sPDCCH, where the number of layers is configured to be one by default. In some examples, the identification component 1110 may identify a slot baseline DMRS mapping pattern for an sPDCCH, where the number of layers is configured on a per-component carrier basis. In some examples, the identification component 1110 may identify a slot baseline DMRS mapping pattern for an sPDCCH, where the number of layers is configured on a per-UE basis. In some examples, the identification component 1110 may identify a slot baseline DMRS mapping pattern for an sPDCCH, where the number of layers is configured on a per-frequency band basis. In some examples, the identification component 1110 may identify a slot baseline DMRS mapping pattern for an sPDCCH, where the number of layers is configured on a per-serving cell basis. In some examples, the identification component 1110 may identify a subslot baseline DMRS mapping pattern for an sPDCCH based on the number of layers configured for a subslot baseline DMRS mapping pattern for a sPDSCH.

The determination component 1115 may determine a shifted DMRS mapping pattern based on the baseline DMRS mapping pattern and a reference signal configuration associated with reference signals other than a DMRS, and determine an actual number of layers to be used for DMRS data, the actual number of layers may be equal to or less than the number of layers identified for the baseline DMRS mapping pattern. The configuration component 1120 may configure REs within the sTTI according to the shifted DMRS mapping pattern and the actual number of layers. The transmission component 1125 may transmit the configured REs, and transmit the actual number of layers to be used for DMRS data in a DCI.

The indication component 1130 may indicate the number of layers to the UE in connection with configuration of the UE for a subslot PDSCH. In some examples, the indication component 1130 may indicate the number of layers to the UE such that the number of layers is identical across all component carriers for which the UE is configured. In some examples, the indication component 1130 may indicate the number of layers to the UE such that the number of layers is identical across all component carriers within the frequency band. The signaling component 1135 may signal the number of layers via RRC signaling.

Figure 12:
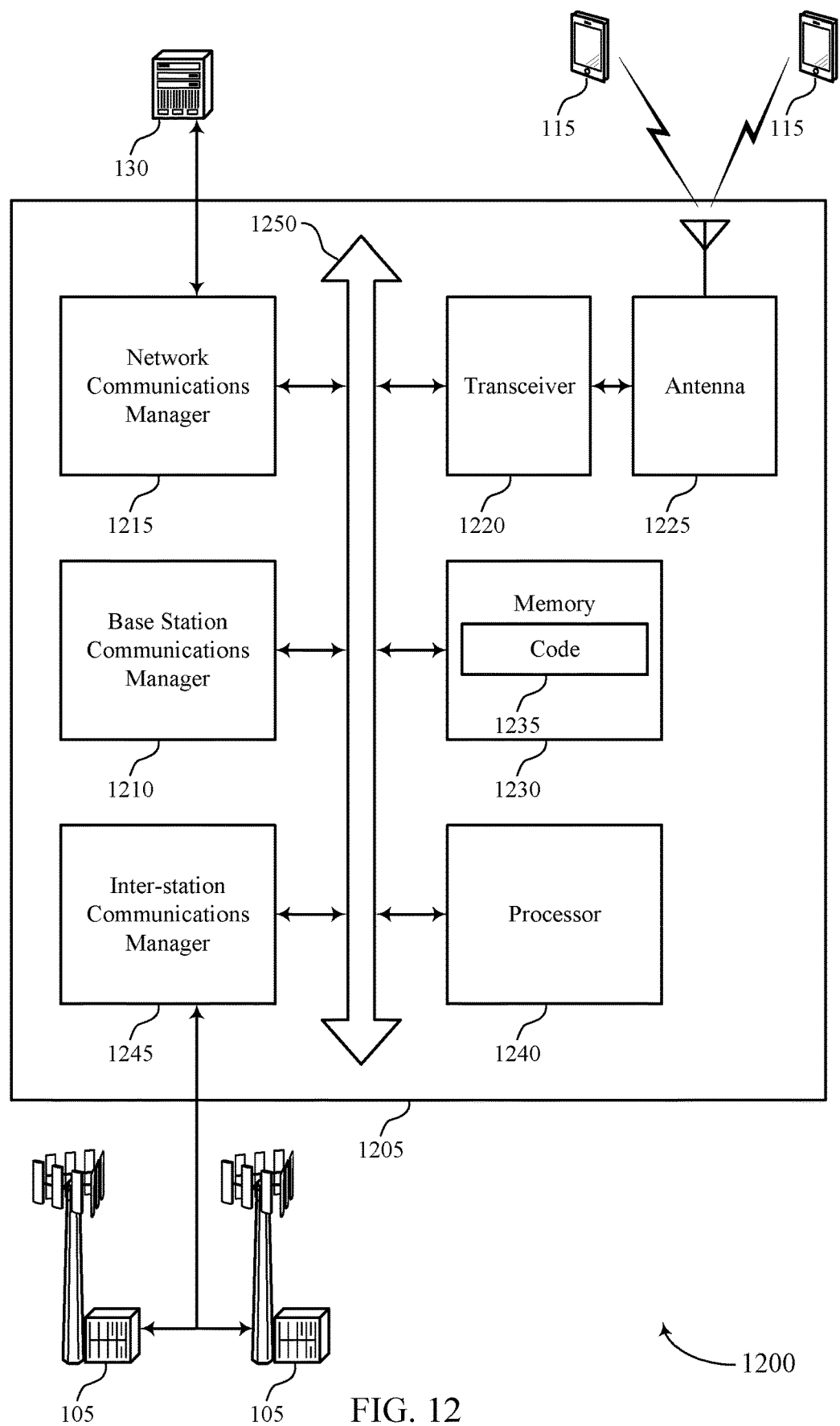
FIG. 12 shows a diagram of a system including a device that DMRS configuration for sTTI baseline pattern in accordance with aspects of the present disclosure.

FIG. 12 shows a diagram of a system 1200 including a device 1205 that supports DMRS configuration for sTTI baseline pattern in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may identify a baseline DMRS mapping pattern for mapping of DMRS data to REs within a sTTI based on a number of layers for which a UE is configured, where the number of layers is configured on a per-unit basis, determine a shifted DMRS mapping pattern based on the baseline DMRS mapping pattern and a reference signal configuration associated with reference signals other than a DMRS, configure REs within the sTTI according to the shifted DMRS mapping pattern, and transmit the configured REs.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting DMRS configuration for sTTI baseline pattern).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
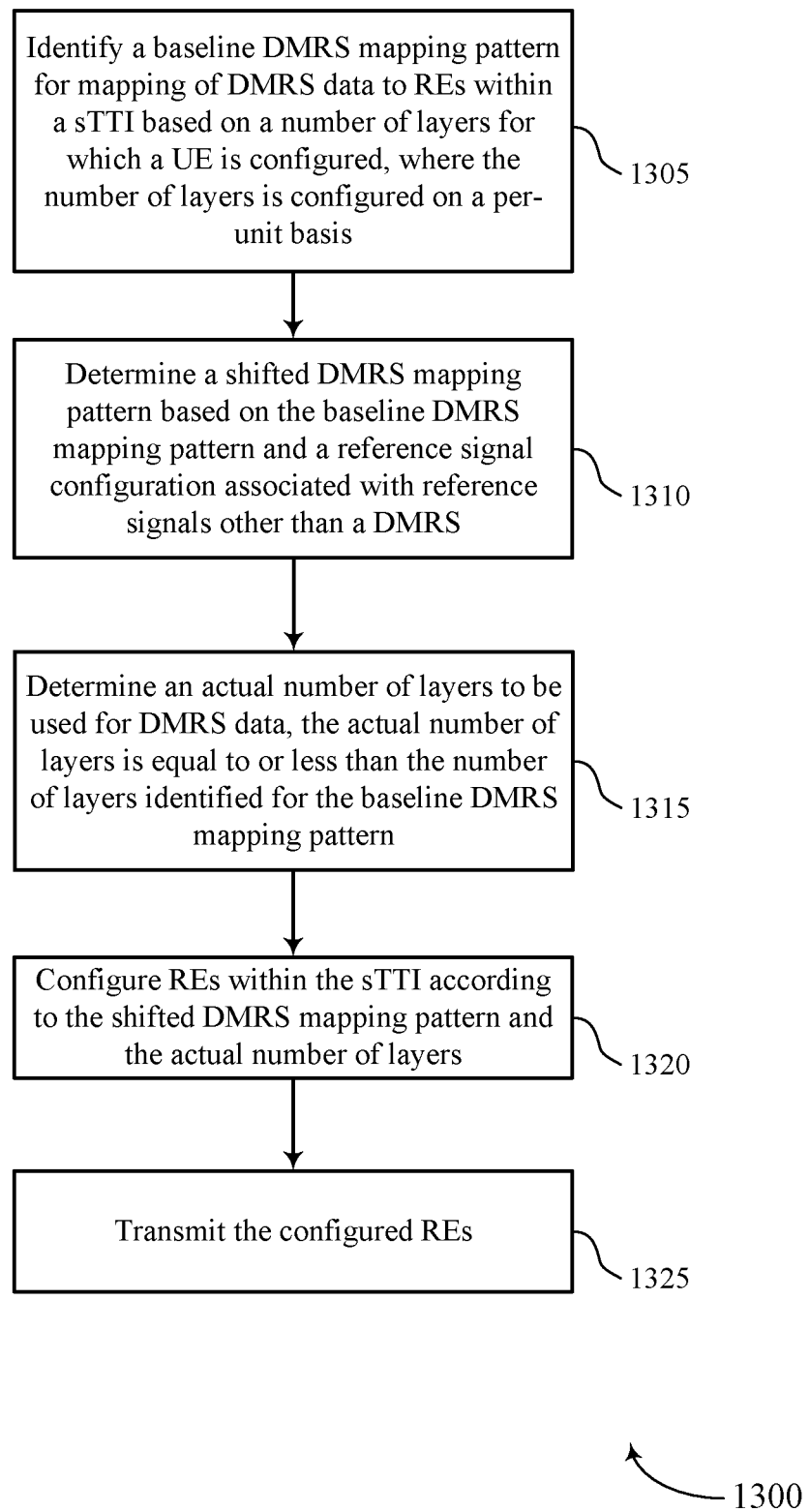
FIGS. 13 through 17 show flowcharts illustrating methods that support DMRS configuration for sTTI baseline pattern in accordance with aspects of the present disclosure.

FIG. 13 shows a flowchart illustrating a method 1300 that supports DMRS configuration for sTTI baseline pattern in accordance with aspects of the present disclosure. The operations of method 1300 may be implemented by a base station 105 or its components as described herein. For example, the operations of method 1300 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1305, the base station may identify a baseline DMRS mapping pattern for mapping of DMRS data to REs within a sTTI based on a number of layers for which a UE is configured, where the number of layers is configured on a per-unit basis. The operations of 1305 may be performed according to the methods described herein. In some examples, aspects of the operations of 1305 may be performed by an identification component as described with reference to FIGS. 9 through 12.

At 1310, the base station may determine a shifted DMRS mapping pattern based on the baseline DMRS mapping pattern and a reference signal configuration associated with reference signals other than a DMRS. The operations of 1310 may be performed according to the methods described herein. In some examples, aspects of the operations of 1310 may be performed by a determination component as described with reference to FIGS. 9 through 12.

At 1315, the base station may determine an actual number of layers to be used for DMRS data, the actual number of layers is equal to or less than the number of layers identified for the baseline DMRS mapping pattern. The operations of 1315 may be performed according to the methods described herein. In some examples, aspects of the operations of 1315 may be performed by a configuration component as described with reference to FIGS. 9 through 12.

At 1320, the base station may configure REs within the sTTI according to the shifted DMRS mapping pattern and the actual number of layers. The operations of 1320 may be performed according to the methods described herein. In some examples, aspects of the operations of 1320 may be performed by a configuration component as described with reference to FIGS. 9 through 12.

At 1325, the base station may transmit the configured REs. The operations of 1325 may be performed according to the methods described herein. In some examples, aspects of the operations of 1325 may be performed by a transmitter as described with reference to FIGS. 9 through 12.

Figure 14:
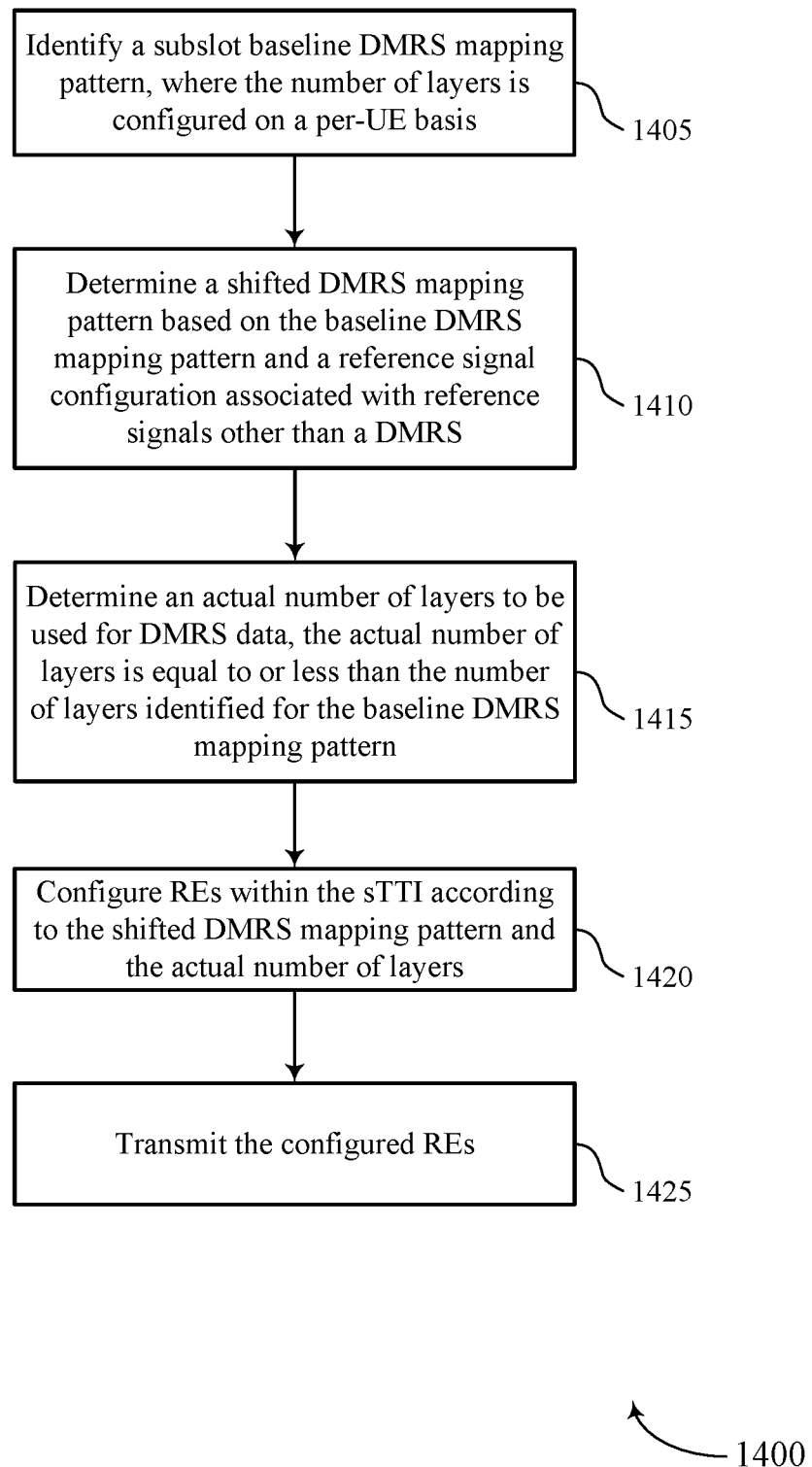

FIG. 14 shows a flowchart illustrating a method 1400 that supports DMRS configuration for sTTI baseline pattern in accordance with aspects of the present disclosure. The operations of method 1400 may be implemented by a base station 105 or its components as described herein. For example, the operations of method 1400 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1405, the base station may identify a subslot baseline DMRS mapping pattern, where the number of layers is configured on a per-UE basis. The operations of 1405 may be performed according to the methods described herein. In some examples, aspects of the operations of 1405 may be performed by an identification component as described with reference to FIGS. 9 through 12.

At 1410, the base station may determine a shifted DMRS mapping pattern based on the baseline DMRS mapping pattern and a reference signal configuration associated with reference signals other than a DMRS. The operations of 1410 may be performed according to the methods described herein. In some examples, aspects of the operations of 1410 may be performed by a determination component as described with reference to FIGS. 9 through 12.

At 1415, the base station may determine an actual number of layers to be used for DMRS data, the actual number of layers is equal to or less than the number of layers identified for the baseline DMRS mapping pattern. The operations of 1415 may be performed according to the methods described herein. In some examples, aspects of the operations of 1415 may be performed by a configuration component as described with reference to FIGS. 9 through 12.

At 1420, the base station may configure REs within the sTTI according to the shifted DMRS mapping pattern and the actual number of layers. The operations of 1420 may be performed according to the methods described herein. In some examples, aspects of the operations of 1420 may be performed by a configuration component as described with reference to FIGS. 9 through 12.

At 1425, the base station may transmit the configured REs. The operations of 1425 may be performed according to the methods described herein. In some examples, aspects of the operations of 1425 may be performed by a transmitter as described with reference to FIGS. 9 through 12.

Figure 15:
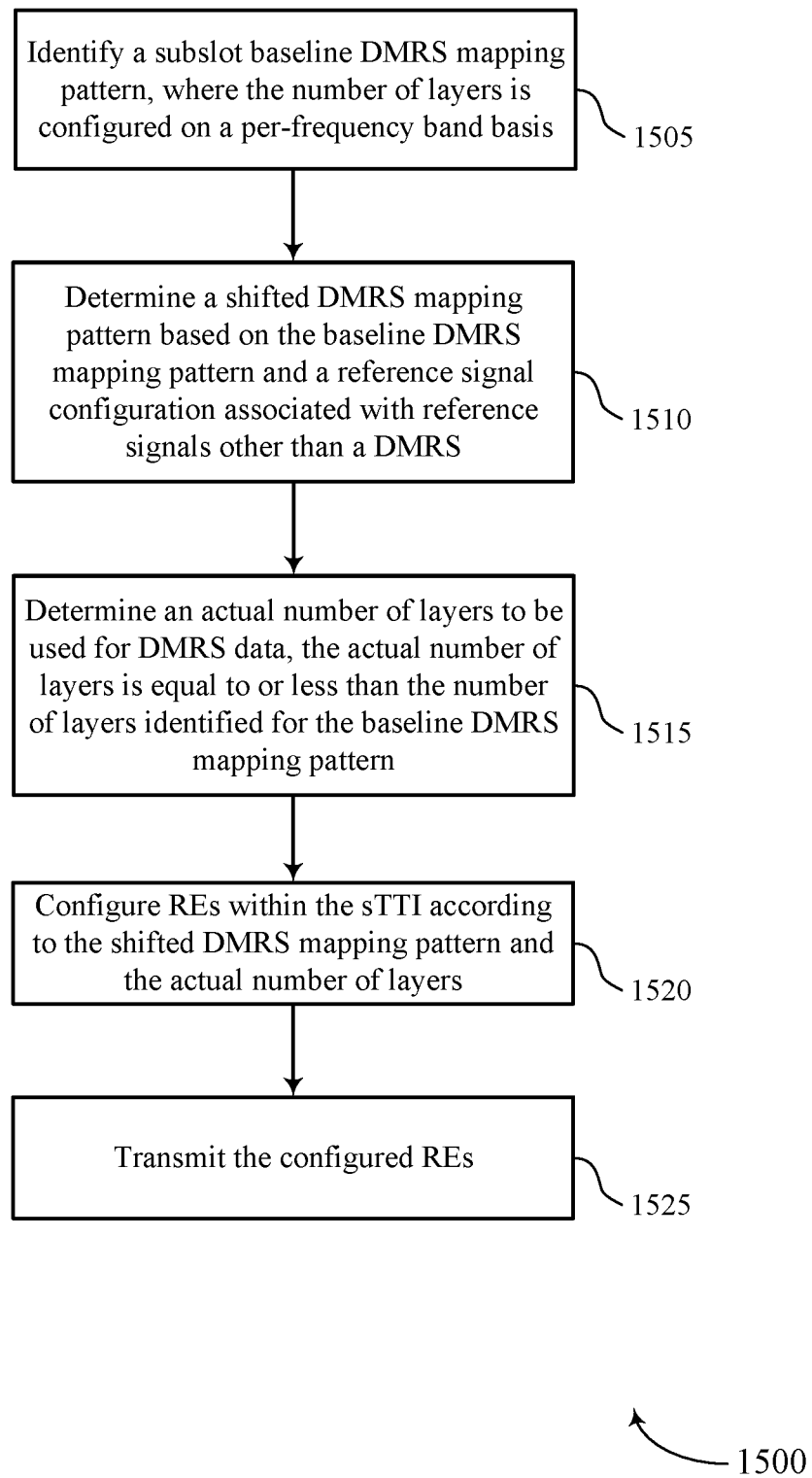

FIG. 15 shows a flowchart illustrating a method 1500 that supports DMRS configuration for sTTI baseline pattern in accordance with aspects of the present disclosure. The operations of method 1500 may be implemented by a base station 105 or its components as described herein. For example, the operations of method 1500 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1505, the base station may identify a subslot baseline DMRS mapping pattern, where the number of layers is configured on a per-frequency band basis. The operations of 1505 may be performed according to the methods described herein. In some examples, aspects of the operations of 1505 may be performed by an identification component as described with reference to FIGS. 9 through 12.

At 1510, the base station may determine a shifted DMRS mapping pattern based on the baseline DMRS mapping pattern and a reference signal configuration associated with reference signals other than a DMRS. The operations of 1510 may be performed according to the methods described herein. In some examples, aspects of the operations of 1510 may be performed by a determination component as described with reference to FIGS. 9 through 12.

At 1515, the base station may determine an actual number of layers to be used for DMRS data, the actual number of layers is equal to or less than the number of layers identified for the baseline DMRS mapping pattern. The operations of 1515 may be performed according to the methods described herein. In some examples, aspects of the operations of 1515 may be performed by a configuration component as described with reference to FIGS. 9 through 12.

At 1520, the base station may configure REs within the sTTI according to the shifted DMRS mapping pattern and the actual number of layers. The operations of 1520 may be performed according to the methods described herein. In some examples, aspects of the operations of 1520 may be performed by a configuration component as described with reference to FIGS. 9 through 12.

At 1525, the base station may transmit the configured REs. The operations of 1525 may be performed according to the methods described herein. In some examples, aspects of the operations of 1525 may be performed by a transmitter as described with reference to FIGS. 9 through 12.

Figure 16:
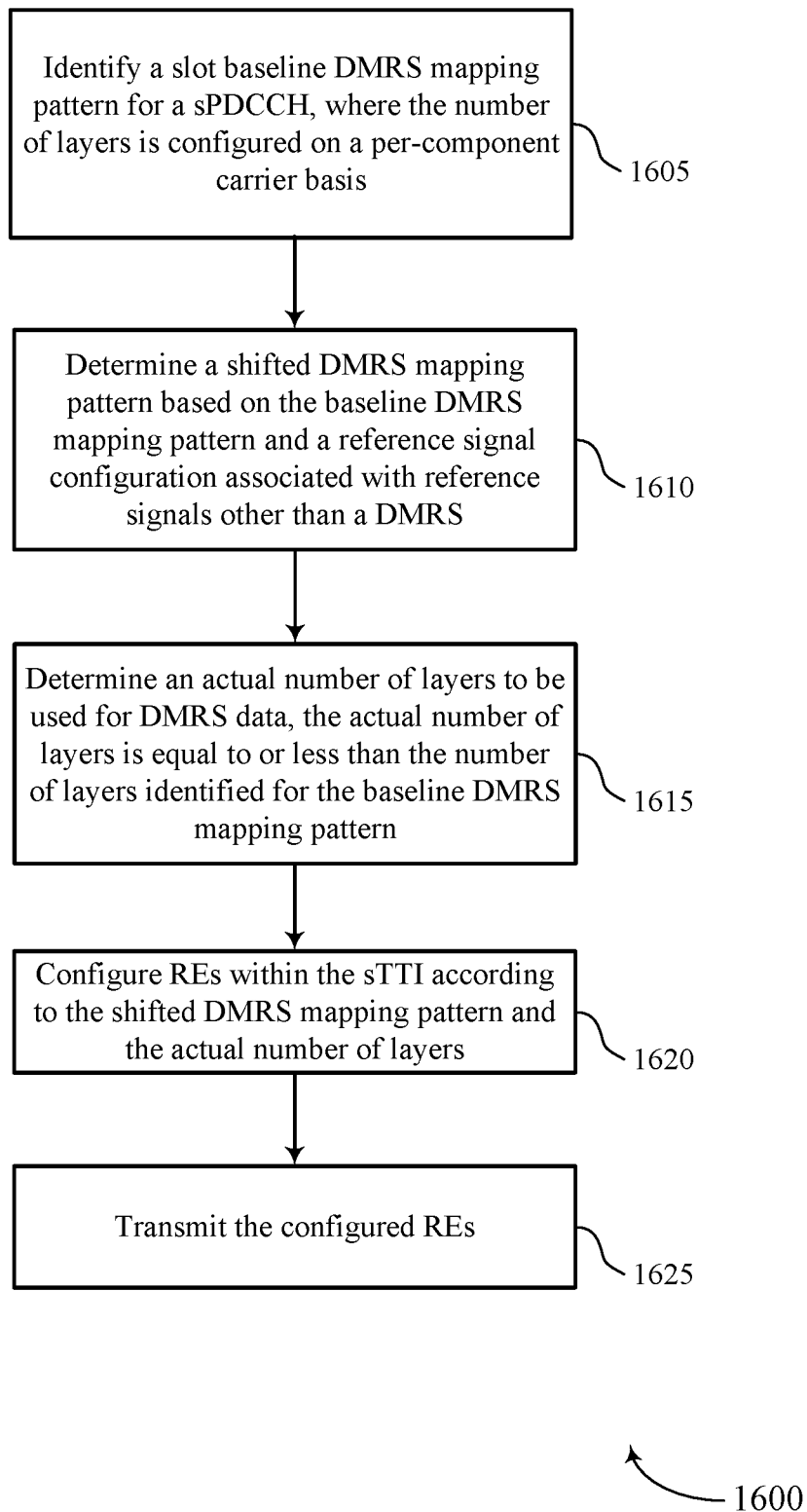

FIG. 16 shows a flowchart illustrating a method 1600 that supports DMRS configuration for sTTI baseline pattern in accordance with aspects of the present disclosure. The operations of method 1600 may be implemented by a base station 105 or its components as described herein. For example, the operations of method 1600 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1605, the base station may identify a slot baseline DMRS mapping pattern for an sPDCCH, where the number of layers is configured on a per-component carrier basis. The operations of 1605 may be performed according to the methods described herein. In some examples, aspects of the operations of 1605 may be performed by an identification component as described with reference to FIGS. 9 through 12.

At 1610, the base station may determine a shifted DMRS mapping pattern based on the baseline DMRS mapping pattern and a reference signal configuration associated with reference signals other than a DMRS. The operations of 1610 may be performed according to the methods described herein. In some examples, aspects of the operations of 1610 may be performed by a determination component as described with reference to FIGS. 9 through 12.

At 1615, the base station may determine an actual number of layers to be used for DMRS data, the actual number of layers is equal to or less than the number of layers identified for the baseline DMRS mapping pattern. The operations of 1615 may be performed according to the methods described herein. In some examples, aspects of the operations of 1615 may be performed by a configuration component as described with reference to FIGS. 9 through 12.

At 1620, the base station may configure REs within the sTTI according to the shifted DMRS mapping pattern and the actual number of layers. The operations of 1620 may be performed according to the methods described herein. In some examples, aspects of the operations of 1620 may be performed by a configuration component as described with reference to FIGS. 9 through 12.

At 1625, the base station may transmit the configured REs. The operations of 1625 may be performed according to the methods described herein. In some examples, aspects of the operations of 1625 may be performed by a transmitter as described with reference to FIGS. 9 through 12.

Figure 17:
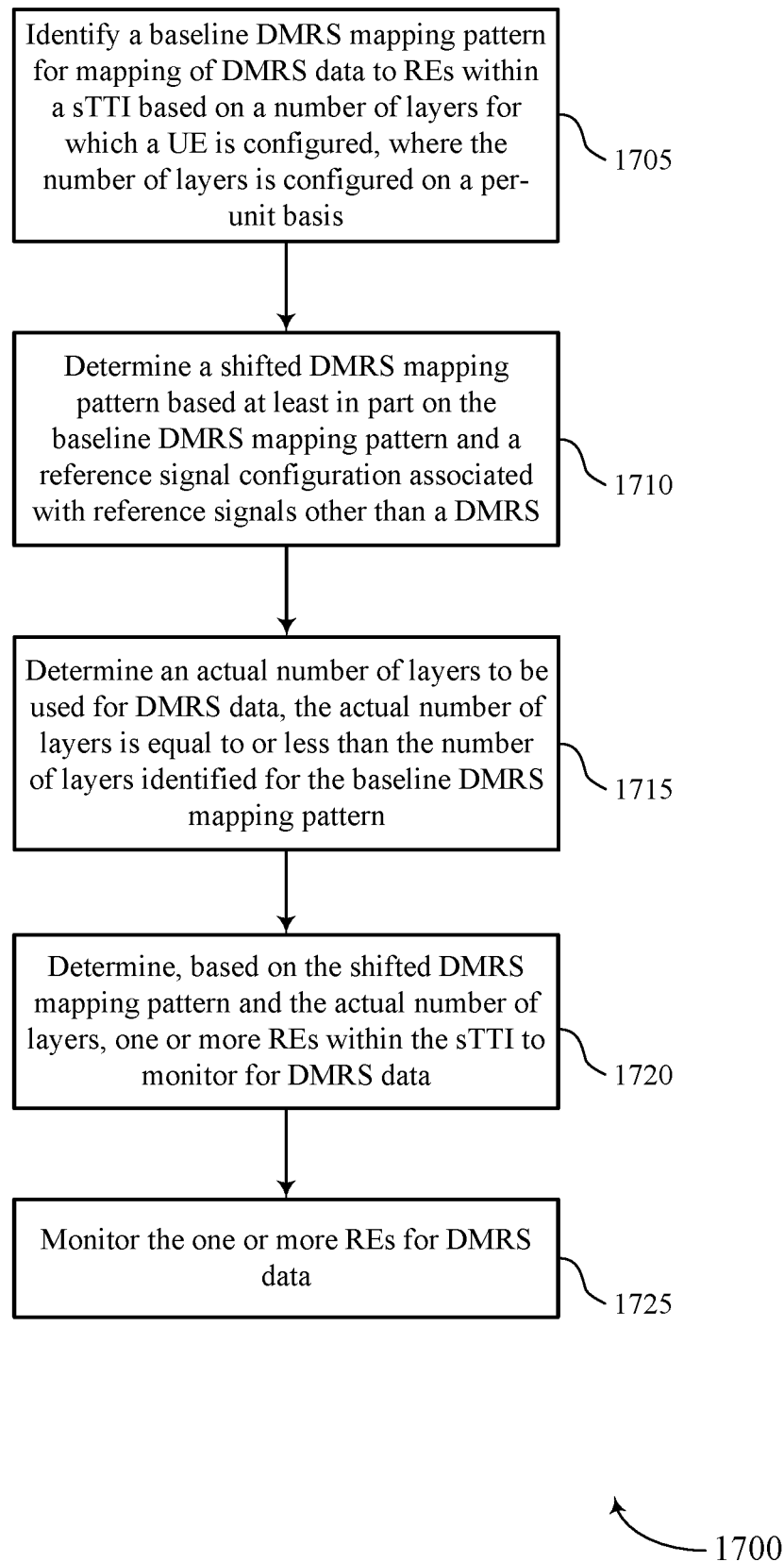

FIG. 17 shows a flowchart illustrating a method 1700 that supports DMRS configuration for sTTI baseline pattern in accordance with aspects of the present disclosure. The operations of method 1700 may be implemented by a UE 115 or its components as described herein. For example, the operations of method 1700 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1705, the UE may a baseline DMRS mapping pattern for mapping of DMRS data to REs within a sTTI based at least in part on a number of layers for which the UE is configured, wherein the number of layers is configured on a per-unit. The operations of 1705 may be performed according to the methods described herein. In some examples, aspects of the operations of 1705 may be performed by an identification component as described with reference to FIGS. 5 through 8.

At 1710, the UE may determine a shifted DMRS mapping pattern based at least in part on the baseline DMRS mapping pattern and a reference signal configuration associated with reference signals other than a DMRS. The operations of 1710 may be performed according to the methods described herein. In some examples, aspects of the operations of 1710 may be performed by a determination component as described with reference to FIGS. 5 through 8.

At 1715, the base station may determine an actual number of layers to be used for DMRS data, the actual number of layers is equal to or less than the number of layers identified for the baseline DMRS mapping pattern. The operations of 1715 may be performed according to the methods described herein. In some examples, aspects of the operations of 1715 may be performed by a determination component as described with reference to FIGS. 5 through 8.

At 1720, the UE may determine, based at least in part on the shifted DMRS mapping pattern and the actual number of layers, one or more REs within the sTTI to monitor for DMRS data. The operations of 1720 may be performed according to the methods described herein. In some examples, aspects of the operations of 1720 may be performed by a determination component as described with reference to FIGS. 5 through 8.

At 1725, the UE may monitor the one or more REs for DMRS data. The operations of 1725 may be performed according to the methods described herein. In some examples, aspects of the operations of 1725 may be performed by a monitoring component as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
identifying a baseline demodulation reference signal (DMRS) mapping pattern for mapping of DMRS data to resource elements (REs) within a shortened transmission time interval (sTTI) based at least in part on a number of layers for which a user equipment (UE) is configured, wherein the number of layers is configured on a per-unit basis;
determining a shifted DMRS mapping pattern based at least in part on the baseline DMRS mapping pattern and a reference signal configuration associated with reference signals other than a DMRS;
determining an actual number of layers to be used for DMRS data, wherein the actual number of layers is equal to or less than the number of layers identified for the baseline DMRS mapping pattern;
configuring REs within the sTTI according to the shifted DMRS mapping pattern and the actual number of layers; and
transmitting the configured REs.

2. The method of claim 1, wherein identifying the baseline DMRS mapping pattern comprises:
identifying a subslot baseline DMRS mapping pattern, wherein the number of layers is configured on a per-component carrier basis.

3. The method of claim 2, further comprising:
indicating the number of layers to the UE in connection with configuration of the UE for a subslot physical downlink shared channel (PDSCH).

4. The method of claim 1, wherein identifying the baseline DMRS mapping pattern comprises:
identifying a subslot baseline DMRS mapping pattern, wherein the number of layers is configured on a per-UE basis.

5. The method of claim 4, further comprising:
indicating the number of layers to the UE such that the number of layers is identical across all component carriers for which the UE is configured.

6. The method of claim 1, wherein identifying the baseline DMRS mapping pattern comprises:
identifying a subslot baseline DMRS mapping pattern, wherein the number of layers is configured on a per-frequency band basis.

7. The method of claim 6, further comprising:
indicating the number of layers to the UE such that the number of layers is identical across all component carriers within the frequency band.

8. The method of claim 1, wherein identifying the baseline DMRS mapping pattern comprises:
identifying a subslot baseline DMRS mapping pattern for a shortened physical downlink control channel (sPDCCH) based on the number of layers configured for a subslot baseline DMRS mapping pattern for a shortened physical downlink shared channel (sPDSCH).

9. The method of claim 1, wherein identifying the baseline DMRS mapping pattern comprises:
identifying a slot baseline DMRS mapping pattern for a shortened physical downlink control channel (sPDCCH) based on the number of layers configured for a subslot baseline DMRS mapping pattern.

10. The method of claim 1, wherein identifying the baseline DMRS mapping pattern comprises:
identifying a slot baseline DMRS mapping pattern for a shortened physical downlink control channel (sPDCCH), wherein the number of layers is configured to be one by default.

11. The method of claim 1, wherein identifying the baseline DMRS mapping pattern comprises:
identifying a slot baseline DMRS mapping pattern for a shortened physical downlink control channel (sPDCCH), wherein the number of layers is configured on a per-component carrier basis, a per-UE basis, a per-frequency band basis, a per-serving cell basis, or a combination thereof.

12. The method of claim 1, further comprising:
signaling the number of layers via radio resource control (RRC) signaling.

13. The method of claim 1, further comprising:
transmitting the actual number of layers to be used for DMRS data in a downlink control information (DCI).

14. A method for wireless communications, comprising:
identifying a baseline demodulation reference signal (DMRS) mapping pattern for mapping of DMRS data to resource elements (REs) within a shortened transmission time interval (sTTI) based at least in part on a number of layers for which a user equipment (UE) is configured, wherein the number of layers is configured on a per-unit basis;
determining a shifted DMRS mapping pattern based at least in part on the baseline DMRS mapping pattern and a reference signal configuration associated with reference signals other than a DMRS;
determining an actual number of layers to be used for DMRS data, wherein the actual number of layers is equal to or less than the number of layers identified for the baseline DMRS mapping pattern;
determining, based at least in part on the shifted DMRS mapping pattern and the actual number of layers, one or more REs within the sTTI to monitor for DMRS data; and
monitoring the one or more REs for DMRS data.

15. The method of claim 14, wherein identifying the baseline DMRS mapping pattern comprises:
identifying a subslot baseline DMRS mapping pattern, wherein the number of layers is configured on a per-component carrier basis.

16. The method of claim 15, further comprising:
receiving an indication of the number of layers in connection with a configuration of the UE for a subslot physical downlink shared channel (PDSCH).

17. The method of claim 14, wherein identifying the baseline DMRS mapping pattern comprises:
identifying a subslot baseline DMRS mapping pattern, wherein the number of layers is configured on a per-UE basis.

18. The method of claim 17, further comprising:
receiving an indication of the number of layers such that the number of layers is identical across all component carriers for which the UE is configured.

19. The method of claim 14, wherein identifying the baseline DMRS mapping pattern comprises:
identifying a subslot baseline DMRS mapping pattern, wherein the number of layers is configured on a per-frequency band basis.

20. The method of claim 19, further comprising:
receiving an indication of the number of layers such that the number of layers is identical across all component carriers within the frequency band.

21. The method of claim 14, wherein identifying the baseline DMRS mapping pattern comprises:
identifying a slot baseline DMRS mapping pattern for a shortened physical downlink control channel (sPDCCH), wherein the number of layers is configured to be one by default.

22. The method of claim 14, wherein identifying the baseline DMRS mapping pattern comprises:
identifying a subslot baseline DMRS mapping pattern for a shortened physical downlink control channel (sPDCCH) based on the number of layers configured for a subslot baseline DMRS mapping pattern for a shortened physical downlink shared channel (sPDSCH).

23. The method of claim 14, wherein identifying the baseline DMRS mapping pattern comprises:
identifying a slot baseline DMRS mapping pattern for a shortened physical downlink control channel (sPDCCH) based on the number of layers configured for a subslot baseline DMRS mapping pattern.

24. The method of claim 14, wherein identifying the baseline DMRS mapping pattern comprises:
identifying a slot baseline DMRS mapping pattern for a shortened physical downlink control channel (sPDCCH), wherein the number of layers is configured on a per-component carrier basis, a per-UE basis, a per-frequency band basis, a per-serving cell basis or a combination thereof.

25. The method of claim 14, further comprising:
receiving an indication of the number of layers via radio resource control (RRC) signaling.

26. The method of claim 14, further comprising:
receiving the actual number of layers to be used for DMRS data in a downlink control information (DCI).

27. An apparatus for wireless communications, comprising:
a processor,
memory in electronic communication with the processor; and
instructions stored in the memory and executable by the processor to cause the apparatus to:
identify a baseline demodulation reference signal (DMRS) mapping pattern for mapping of DMRS data to resource elements (REs) within a shortened transmission time interval (sTTI) based at least in part on a number of layers for which a user equipment (UE) is configured, wherein the number of layers is configured on a per-unit basis;
determine a shifted DMRS mapping pattern based at least in part on the baseline DMRS mapping pattern and a reference signal configuration associated with reference signals other than a DMRS;
configure REs within the sTTI according to the shifted DMRS mapping pattern; and
transmit the configured REs.

28. The apparatus of claim 27, wherein the instructions to identify the baseline DMRS mapping pattern are executable by the processor to cause the apparatus to:
identify a subslot baseline DMRS mapping pattern for a shortened physical downlink control channel (sPDCCH) based on the number of layers configured for a subslot baseline DMRS mapping pattern for a shortened physical downlink shared channel (sPDSCH).

29. An apparatus for wireless communications, comprising:
a processor,
memory in electronic communication with the processor; and
instructions stored in the memory and executable by the processor to cause the apparatus to:
identify a baseline demodulation reference signal (DMRS) mapping pattern for mapping of DMRS data to resource elements (REs) within a shortened transmission time interval (sTTI) based at least in part on a number of layers for which the apparatus is configured, wherein the number of layers is configured on a per-unit basis;
determine a shifted DMRS mapping pattern based at least in part on the baseline DMRS mapping pattern and a reference signal configuration associated with reference signals other than a DMRS;
determine, based at least in part on the shifted DMRS mapping pattern, one or more REs within the sTTI to monitor for DMRS data; and
monitor the one or more REs for DMRS data.

30. The apparatus of claim 29, wherein the instructions to identify the baseline DMRS mapping pattern are executable by the processor to cause the apparatus to:
identify a subslot baseline DMRS mapping pattern for a shortened physical downlink control channel (sPDCCH) based on the number of layers configured for a subslot baseline DMRS mapping pattern for a shortened physical downlink shared channel (sPDSCH).

* * * * *